United States Patent
Chiba

(10) Patent No.: US 8,014,626 B2
(45) Date of Patent: Sep. 6, 2011

(54) IMAGE PROCESSING DEVICE, IMAGE PROCESSING METHOD, AND PROGRAM

(75) Inventor: Takuya Chiba, Tokyo (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 11/553,280

(22) Filed: Oct. 26, 2006

(65) Prior Publication Data

US 2007/0103564 A1    May 10, 2007

(30) Foreign Application Priority Data

Nov. 9, 2005  (JP) ................. 2005-325078

(51) Int. Cl.
*G06K 9/40* (2006.01)
(52) U.S. Cl. ................... 382/274; 382/166
(58) Field of Classification Search .............. 382/274, 382/264, 284, 289, 224
See application file for complete search history.

(56) References Cited

U.S. PATENT DOCUMENTS 7,529,405 B2 * 5/2009 Masuno et al. ............ 382/166

FOREIGN PATENT DOCUMENTS

| JP | 8-237436 | 9/1996 |
|---|---|---|
| JP | 2001-86332 | 3/2001 |
| JP | 2003-60983 | 2/2003 |
| JP | 2003-143421 | 5/2003 |
| JP | 2003-248827 | 9/2003 |
| JP | 2003-255424 | 9/2003 |
| JP | 2005-184090 | 7/2005 |
| JP | 2005-197952 | 7/2005 |

* cited by examiner

*Primary Examiner* — Samir Ahmed
*Assistant Examiner* — Ruiping Li
(74) *Attorney, Agent, or Firm* — Oblon, Spivak, McClelland, Maier & Neustadt, L.L.P.

(57) ABSTRACT

An image processing device to correct chromatic aberration of image data is provided. The image processing device includes an overexposed pixel detecting unit configured to detect overexposed pixels by using a luminance signal of the image data; an overexposure distribution information generating unit configured to generate overexposure distribution information indicating distribution of the overexposed pixels detected by the overexposed pixel detecting unit; and a chromatic aberration amount calculating unit configured to calculate the amount of chromatic aberration of each pixel by using the overexposure distribution information generated by the overexposure distribution information generating unit and chromatic aberration amount distribution information indicating distribution of the amount of chromatic aberration, which is the amount of correction regarding chromatic aberration of nearby pixels due to overexposure of a target pixel.

12 Claims, 30 Drawing Sheets

IMAGE PROCESSING DEVICE, IMAGE PROCESSING METHOD, AND PROGRAM

CROSS REFERENCES TO RELATED APPLICATIONS

The present invention contains subject matter related to Japanese Patent Application JP 2005-325078 filed in the Japanese Patent Office on Nov. 9, 2005, the entire contents of which are incorporated herein by reference.

BACKGROUND OF THE INVENTION

1. Field of the Invention

The present invention relates to an image processing device, an image processing method, and a program. More specifically, the present invention relates to an image processing device, an image processing method, and a program that are preferably used to correct chromatic aberration in an image.

2. Description of the Related Art

In recent years, electronic cameras have been required to realize high image quality, as well as miniaturization, high magnification, and high resolution. However, it has become very difficult to manufacture lenses having a high MTF (modulation transfer function) characteristic adapted to miniaturization, high magnification, and high resolution. For example, miniaturizing a lens causes various problems: "aberration" in which a focus position is different depending on a position of a screen or a wavelength; "shading" in which the intensity of incident light attenuates at a position nearer to an edge of the screen, and "distortion" in which distortion occurs at some positions of the screen.

Among those problems, aberration, particularly chromatic aberration, is a problem peculiar to a lens. A technique of correcting chromatic aberration by signal processing has been suggested (e.g., see Patent Document 1: Japanese Unexamined Patent Application Publication No. 2003-255424).

According to a method suggested in Patent Document 1, a position of the center of an optical axis of a picture taking lens is determined in each image of red (R), green (G), and blue (B), and resolution is converted by scaling up/down the images in accordance with data of a conversion rate with the position being the center.

SUMMARY OF THE INVENTION

However, the chromatic aberration includes not only "magnification chromatic aberration", in which magnification of an image differs depending on colors, but also "axial chromatic aberration", which occurs due to a difference in focus positions of colors. It may be impossible to correct the "axial chromatic aberration" in the method disclosed in Patent Document 1.

The present invention has been made in view of these circumstances and is directed to appropriately correcting two types of chromatic aberration: "axial chromatic aberration" and "magnification chromatic aberration" without isolating them from each other.

According to an embodiment of the present invention, there is provided an image processing device to correct chromatic aberration of image data. The image processing device includes an overexposed pixel detecting unit configured to detect overexposed pixels by using a luminance signal of the image data; an overexposure distribution information generating unit configured to generate overexposure distribution information indicating distribution of the overexposed pixels detected by the overexposed pixel detecting unit; and a chromatic aberration amount calculating unit configured to calculate the amount of chromatic aberration of each pixel by using the overexposure distribution information generated by the overexposure distribution information generating unit and chromatic aberration amount distribution information indicating distribution of the amount of chromatic aberration, which is the amount of correction regarding chromatic aberration of nearby pixels due to overexposure of a target pixel.

The overexposed pixel detecting unit includes an overexposed pixel threshold determining unit configured to determine the overexposed pixel with respect to the target pixel by using a predetermined threshold; and an overexposed pixels determining unit configured to determine whether an overexposed pixel exists near the target pixel that has been determined to be an overexposed pixel by the overexposed pixel threshold determining unit. The overexposed pixel detecting unit can detect the target pixel as an overexposed pixel only when the overexposed pixels determining unit has determined that an overexposed pixel exists near the target pixel as an overexposed pixel.

The overexposure distribution information is information indicating distribution of the overexposed pixels in a predetermined range around the target pixel. The overexposure distribution information generating unit can generate the overexposure distribution information for each pixel in the image data.

The chromatic aberration amount calculating unit includes a comparing unit configured to compare the chromatic aberration amount distribution information with the overexposure distribution information for each pixel of the image data. The chromatic aberration amount calculating unit can calculate the amount of chromatic aberration of each pixel on the basis of a comparison result generated by the comparing unit.

The comparing unit can calculate the amount of chromatic aberration of each pixel of the image data by obtaining the amount of chromatic aberration of a target pixel due to each overexposed pixel included in the overexposure distribution information by using the chromatic aberration amount distribution information for the respective pixels and by integrating the amounts.

The chromatic aberration amount calculating unit can include magnification chromatic aberration correcting unit configured to correct distribution of the chromatic aberration amount distribution information so as to correct magnification chromatic aberration in accordance with the position in a screen of the target pixel of which chromatic aberration is to be corrected.

The image processing device can further include a chromatic aberration correcting unit configured to correct chromatic aberration of each pixel of the image data by using the amount of chromatic aberration calculated by the chromatic aberration amount calculating unit.

The image processing device can further include a chromaticity calculating unit configured to calculate chromaticity, indicating a level of color, of each pixel on the basis of a chrominance signal of the image data. The chromatic aberration correcting unit can multiply the amount of chromatic aberration calculated by the chromatic aberration amount calculating unit by the chromaticity calculated by the chromaticity calculating unit and correct chromatic aberration of the image data by using the multiplication result.

The image processing device can further include a mixing unit configured to mix the image data corrected by the chromatic aberration correcting unit and the image data before correction at a ratio based on the multiplication result generated by the chromatic aberration correcting unit.

According to another embodiment of the present invention, there is provided an image processing method for an image processing device to correct chromatic aberration of image data. The image processing method includes the steps of: detecting overexposed pixels by using a luminance signal of the image data; generating overexposure distribution information indicating distribution of the detected overexposed pixels; and calculating the amount of chromatic aberration of each pixel by using the generated overexposure distribution information and chromatic aberration amount distribution information indicating distribution of the amount of chromatic aberration, which is the amount of correction regarding chromatic aberration of nearby pixels due to overexposure of a target pixel.

According to another embodiment of the present invention, there is provided a program allowing a computer to perform a process of correcting chromatic aberration of image data. The program includes the steps of: detecting overexposed pixels by using a luminance signal of the image data; generating overexposure distribution information indicating distribution of the detected overexposed pixels; and calculating the amount of chromatic aberration of each pixel by using the generated overexposure distribution information and chromatic aberration amount distribution information indicating distribution of the amount of chromatic aberration, which is the amount of correction regarding chromatic aberration of nearby pixels due to overexposure of a target pixel.

With the above-described configuration, overexposed pixels are detected from image data, overexposure distribution information indicating distribution of the detected overexposed pixels is generated, and the amount of chromatic aberration of each pixel is calculated by using the generated overexposure distribution information and chromatic aberration amount distribution information indicating distribution of the amount of chromatic aberration, which is the amount of correction regarding chromatic aberration of nearby pixels due to overexposure of a target pixel.

According to the above-described configuration, an image can be processed. More specifically, chromatic aberration can be corrected more easily and more accurately.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, there is provided an image processing device (e.g., a chromatic aberration correcting unit shown in FIG. 1) to correct chromatic aberration of image data. The image processing device includes an overexposed pixel detecting unit (e.g., an overexposure determining unit shown in FIG. 2) configured to detect overexposed pixels by using a luminance signal of the image data; an overexposure distribution information generating unit (e.g., overexposure information holding unit shown in FIG. 2) configured to generate overexposure distribution information indicating distribution of the overexposed pixels detected by the overexposed pixel detecting unit; and a chromatic aberration amount calculating unit (e.g., a chromatic aberration amount calculating unit shown in FIG. 2) configured to calculate the amount of chromatic aberration of each pixel by using the overexposure distribution information (e.g., an overexposure map shown in FIG. 10) generated by the overexposure distribution information generating unit and chromatic aberration amount distribution information (e.g., a chromatic aberration map shown in FIG. 13) indicating distribution of the amount of chromatic aberration, which is the amount of correction regarding chromatic aberration of nearby pixels due to overexposure of a target pixel.

Figure 3:
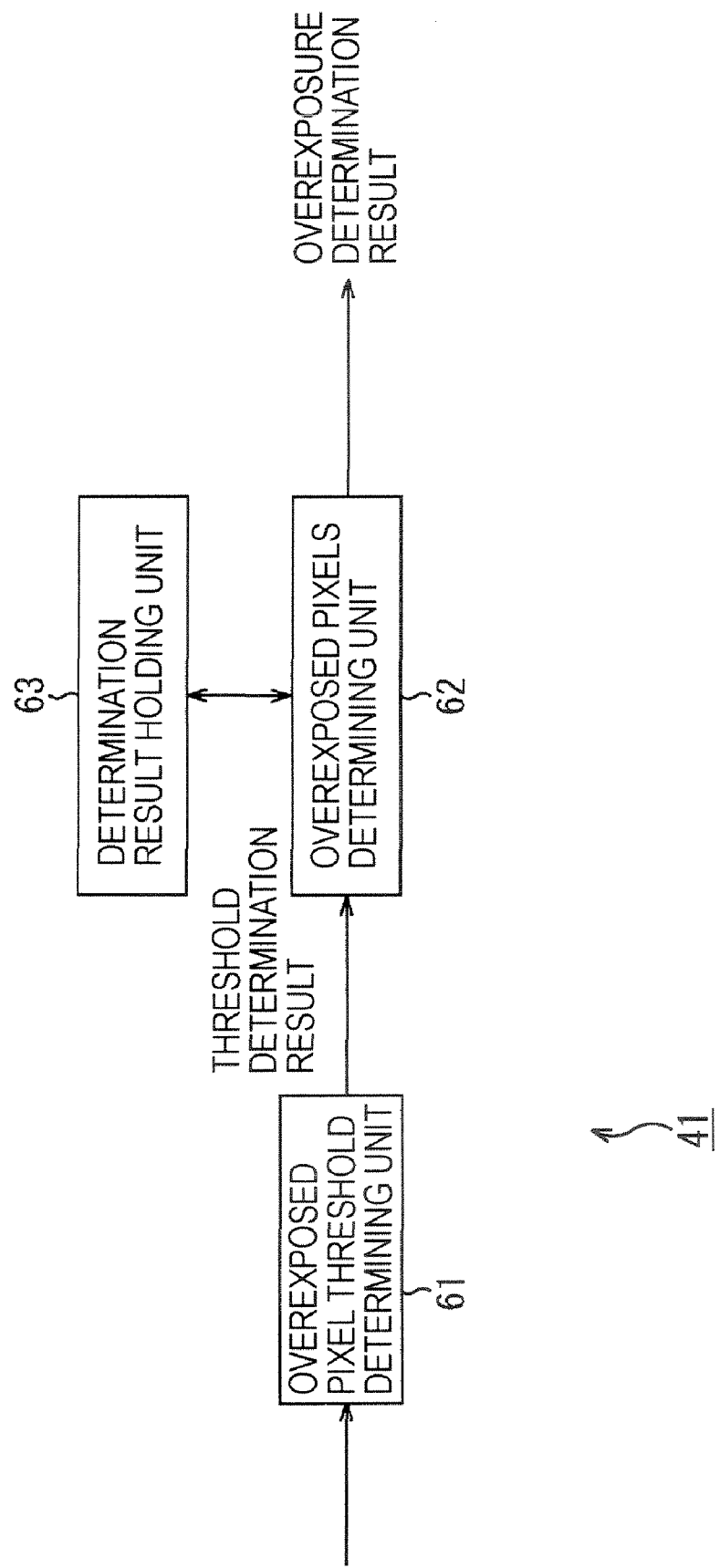
FIG. 3 is a block diagram showing an example of a specific configuration of an overexposure determining unit shown in FIG. 2.
Figure 11:
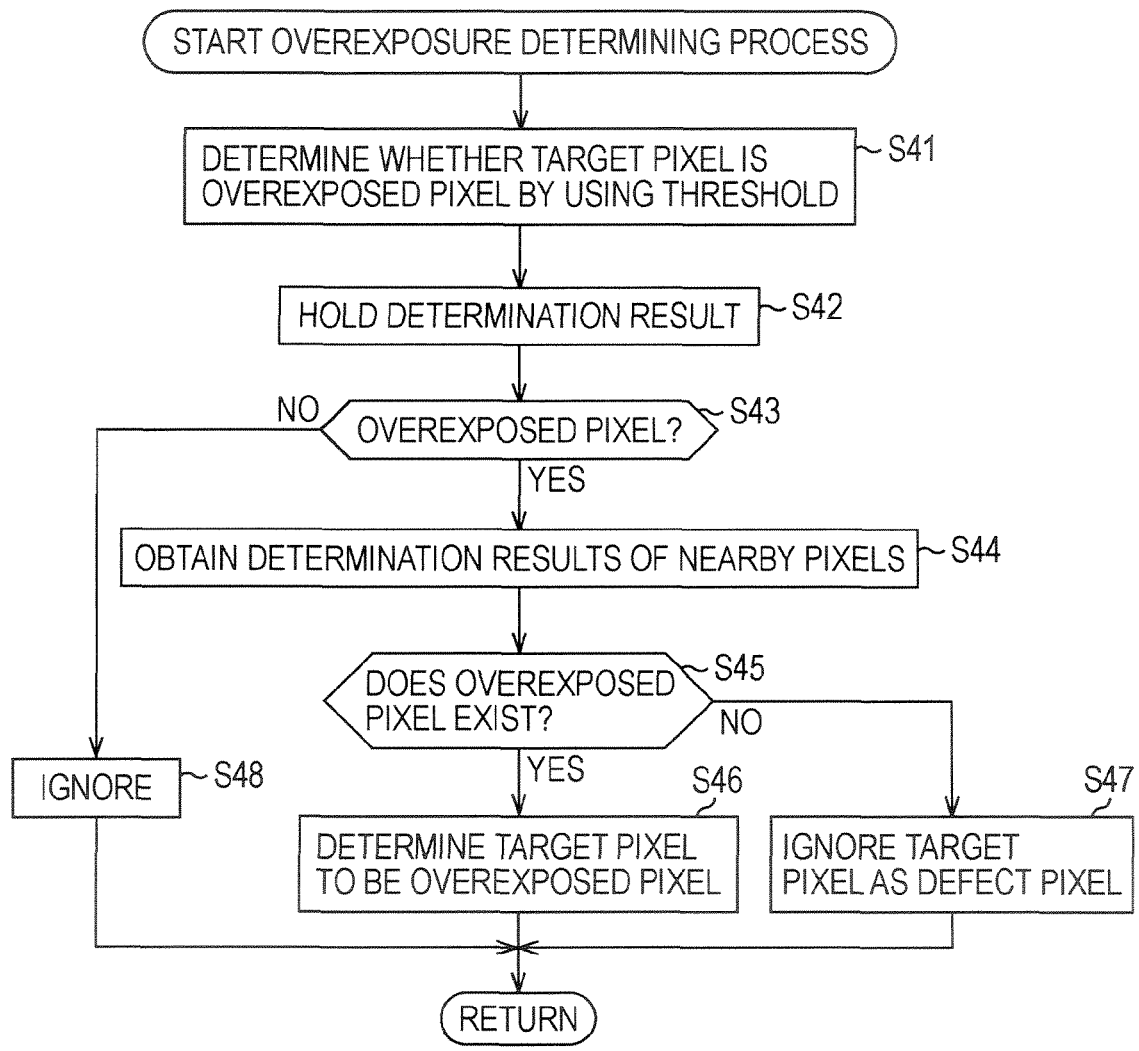
FIG. 11 is a flowchart illustrating an example of an overexposure determining process.

The overexposed pixel detecting unit includes an overexposed pixel threshold determining unit (e.g., an overexposed pixel threshold determining unit shown in FIG. 3) configured to determine the overexposed pixel with respect to the target pixel by using a predetermined threshold; and an overexposed pixels determining unit (e.g., an overexposed pixels determining unit shown in FIG. 3) configured to determine whether an overexposed pixel exists near the target pixel that has been determined to be an overexposed pixel by the overexposed pixel threshold determining unit. The overexposed pixel detecting unit can detect the target pixel as an overexposed pixel only when the overexposed pixels determining unit has determined that an overexposed pixel exists near the target pixel as an overexposed pixel (e.g., step S46 shown in FIG. 11).

Figure 9:
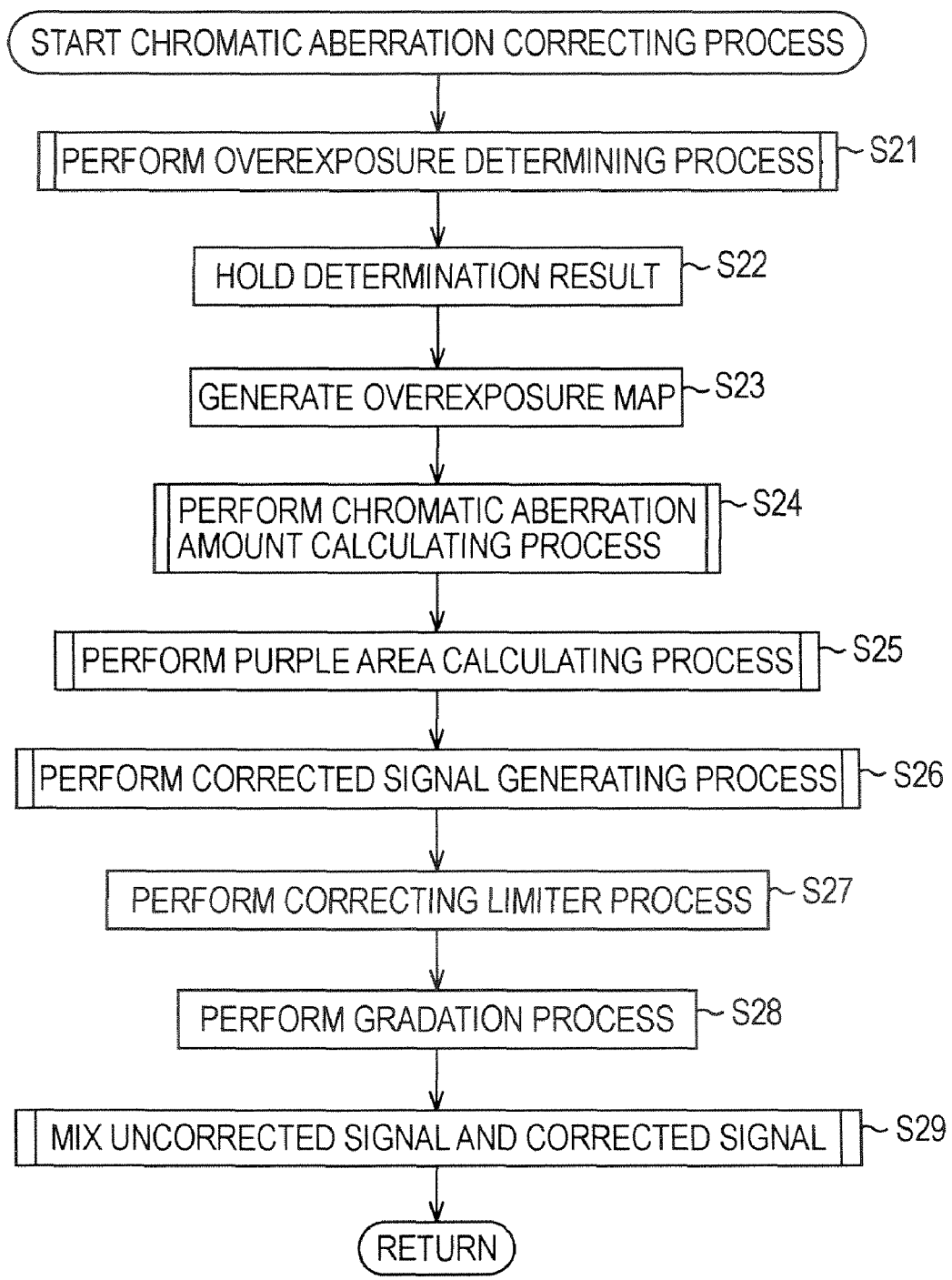
FIG. 9 is a flowchart illustrating an example of a chromatic aberration correcting process.
Figure 10:
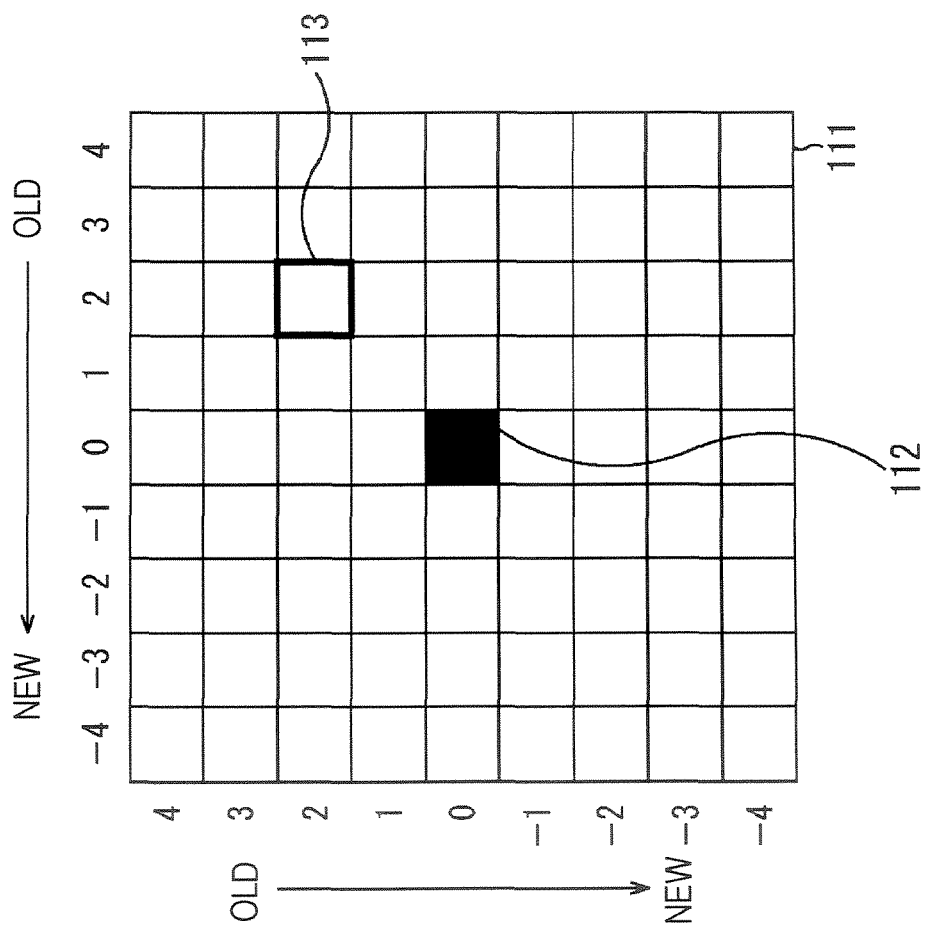
FIG. 10 is a schematic view illustrating an example of a configuration of an overexposure map.

The overexposure distribution information is information indicating distribution of the overexposed pixels in a predetermined range around the target pixel (e.g., the overexposure map shown in FIG. 10). The overexposure distribution information generating unit can generate the overexposure distribution information for each pixel in the image data (e.g., step S23 shown in FIG. 9).

The chromatic aberration amount calculating unit includes a comparing unit (e.g., a map comparing unit shown in FIG. 4) configured to compare the chromatic aberration amount distribution information with the overexposure distribution information for each pixel of the image data. The chromatic aberration amount calculating unit can calculate the amount of chromatic aberration of each pixel on the basis of a comparison result generated by the comparing unit (e.g., step S69 shown in FIG. 12).

Figure 12:
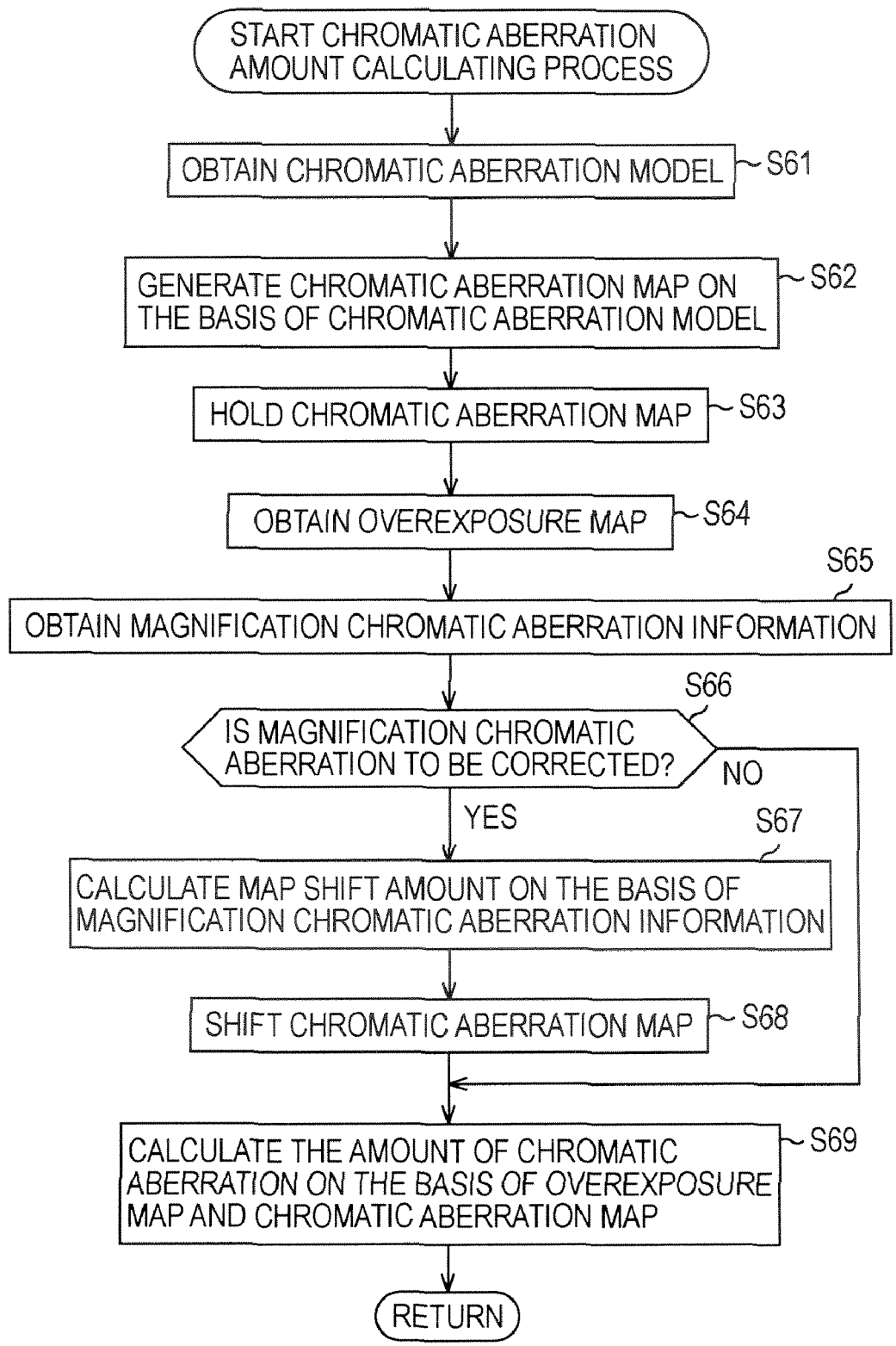
FIG. 12 is a flowchart illustrating an example of a chromatic aberration amount calculating process.

The comparing unit can calculate the amount of chromatic aberration of each pixel of the image data by obtaining the amount of chromatic aberration of a target pixel due to each overexposed pixel included in the overexposure distribution information by using the chromatic aberration amount distribution information for the respective pixels and by integrating the amounts (e.g., step S69 shown in FIG. 12).

Figure 4:
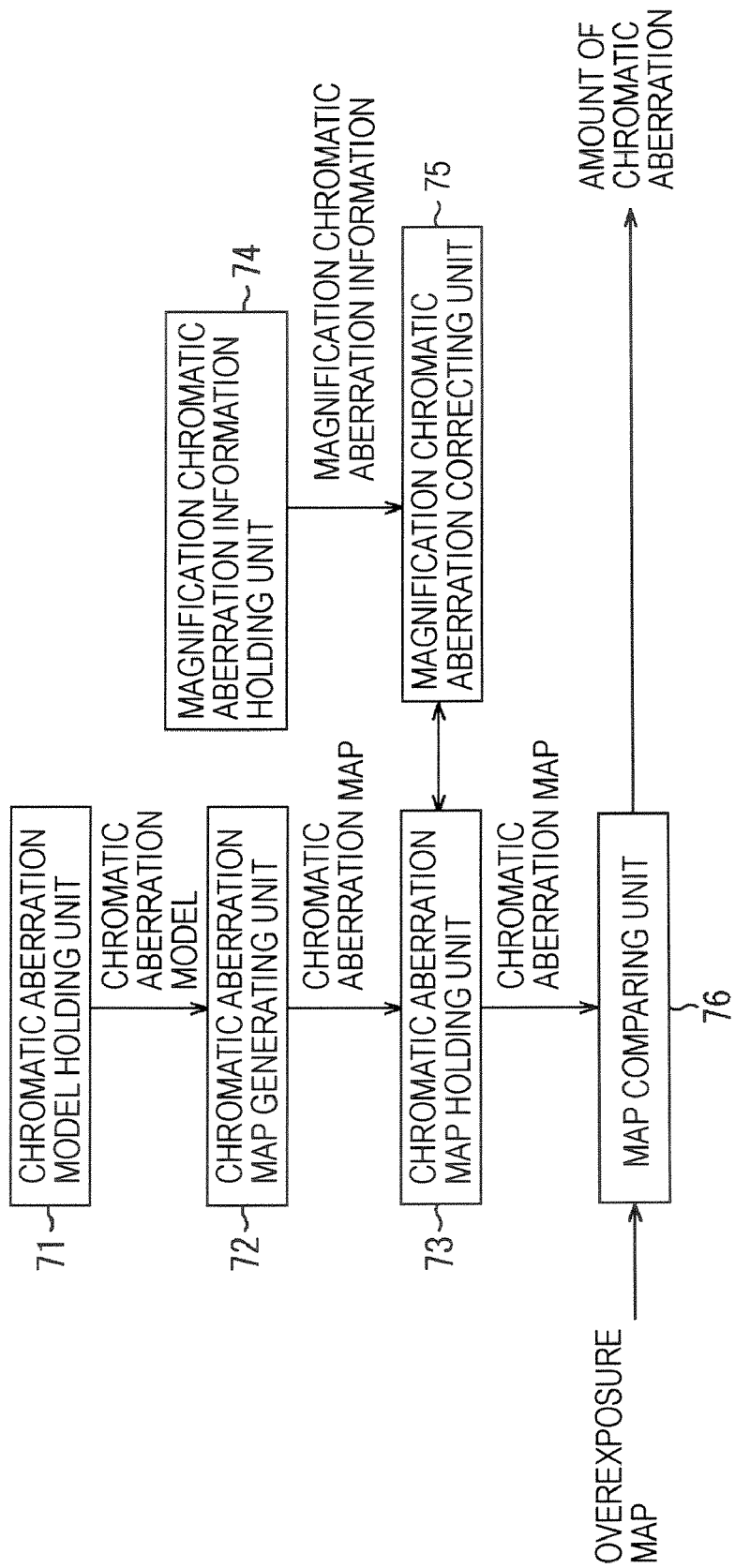
FIG. 4 is a block diagram showing an example of a specific configuration of a chromatic aberration amount calculating unit shown in FIG. 2.

The chromatic aberration amount calculating unit can include a magnification chromatic aberration correcting unit (e.g., a magnification chromatic aberration correcting unit shown in FIG. 4) configured to correct distribution of the chromatic aberration amount distribution information so as to correct magnification chromatic aberration in accordance with the position in a screen of the target pixel of which chromatic aberration is to be corrected.

The image processing device can further include a chromatic aberration correcting unit (e.g., a corrected signal generating unit shown in FIG. 2) configured to correct chromatic aberration of each pixel of the image data by using the amount of chromatic aberration calculated by the chromatic aberration amount calculating unit.

The image processing device can further include a chromaticity calculating unit (e.g., a purple area calculating unit shown in FIG. 2) configured to calculate chromaticity, indicating a level of color, of each pixel on the basis of a chrominance signal of the image data. The chromatic aberration correcting unit can multiply the amount of chromatic aberration calculated by the chromatic aberration amount calculating unit by the chromaticity calculated by the chromaticity calculating unit and correct chromatic aberration of the image data by using the multiplication result.

The image processing device can further include a mixing unit (e.g., a mixing unit shown in FIG. 2) configured to mix the image data corrected by the chromatic aberration correcting unit and the image data before correction at a ratio based on the multiplication result generated by the chromatic aberration correcting unit.

According to another embodiment of the present invention, there is provided an image processing method or program for an image processing device (e.g., a chromatic aberration correcting unit shown in FIG. 1) to correct chromatic aberration of image data. The image processing method or the program includes the steps of: detecting overexposed pixels by using a luminance signal of the image data (e.g., step S21 shown in FIG. 9); generating overexposure distribution information indicating distribution of the detected overexposed pixels (e.g., step S23 shown in FIG. 9); and calculating the amount of chromatic aberration of each pixel by using the generated overexposure distribution information and chromatic aberration amount distribution information indicating distribution of the amount of chromatic aberration, which is the amount of correction regarding chromatic aberration of nearby pixels due to overexposure of a target pixel (e.g., step S24 shown in FIG. 9).

Hereinafter, embodiments of the present invention are described with reference to the drawings.

Figure 1:
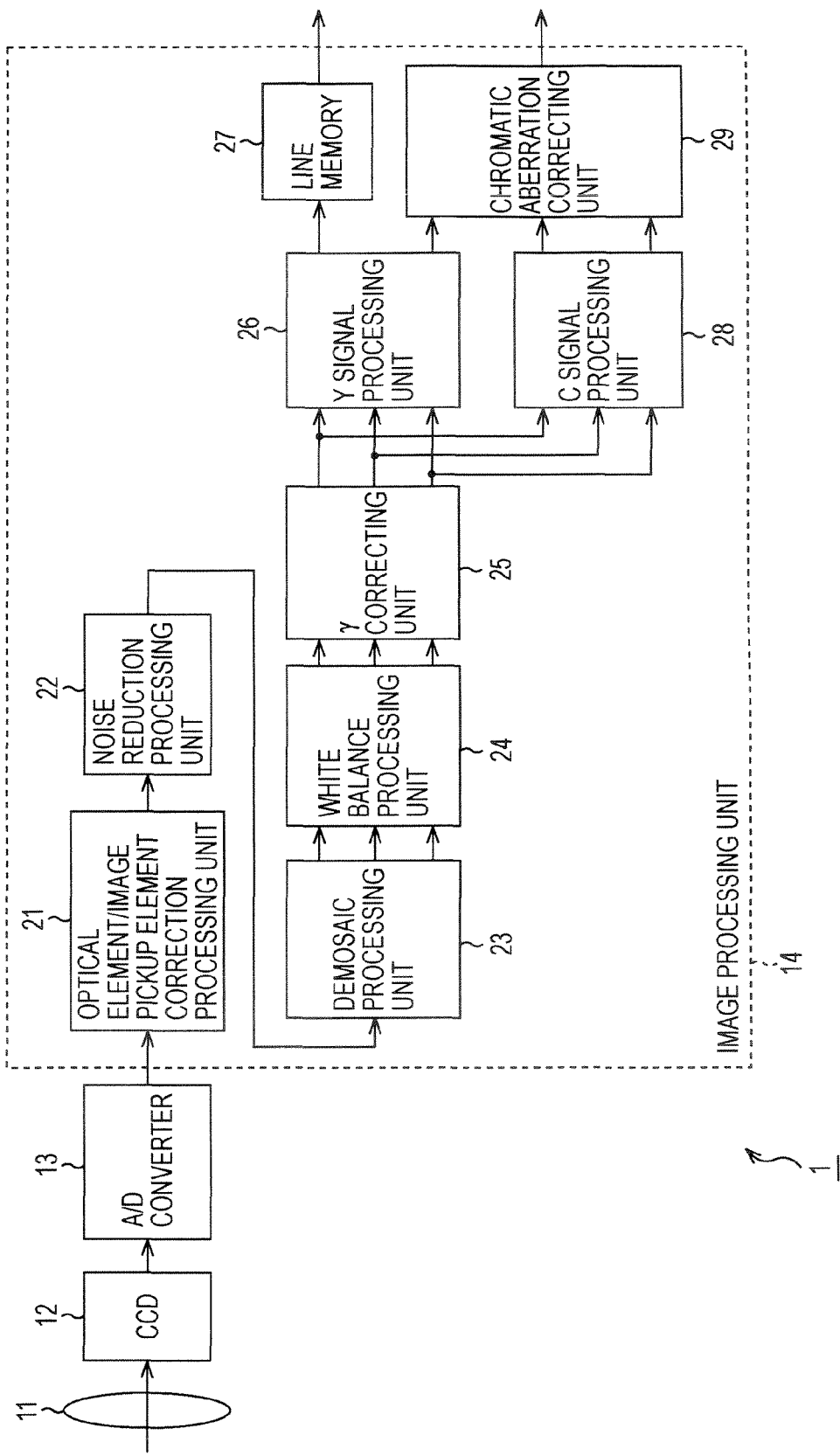
FIG. 1 is a block diagram showing an example of a configuration of an image pickup apparatus according to an embodiment of the present invention.

FIG. 1 is a block diagram showing an example of a configuration of an image pickup apparatus 1 to which the present invention is applied.

In FIG. 1, the image pickup apparatus 1 is an apparatus to pick up images of subjects and obtain digital data of the images. The image pickup apparatus 1 includes a lens unit 11, a CCD (charge-coupled device) 12, an A/D (analog/digital) converter 13, and an image processing unit 14.

The lens unit 11 includes a lens group and an aperture. Incident light from a subject is focused through the lens unit 11 onto the CCD 12. The CCD 12 is an image pickup device including photoelectric converting elements, such as photodiodes, functioning as a light receiver to receive the incident light. The incident light coming through the lens unit 11 is received by the light receiver, photoelectric conversion is performed thereon, and an electric signal generated by the conversion is output to the A/D converter 13.

The respective photodiodes of the light receiver are provided with a red (R), green (G), or blue (B) color filter (not shown) which allows incident light to pass therethrough. The incident light passes through the color filters, so that color components of the respective color filters reach the light receiver. In other words, in the light receiver, respective components of R, G, and B are applied to different positions and photoelectric conversion is performed. That is, the CCD 12 outputs electric signals corresponding to the respective components of R, G, and B to the A/D converter 13.

The A/D converter 13 converts the electric signals (analog signals) of the respective components supplied from the CCD 12 to digital signals and supplies the digital signals (image data) to the image processing unit 14. The image processing unit 14 performs signal processing (image processing) on the supplied image data (R signal, G signal, and B signal) so as to process the image corresponding to the supplied image data, and outputs the image data as luminance and chrominance signals.

Of course, the image pickup apparatus 1 may include another element, for example, a recording medium to record obtained image data.

As shown in FIG. 1, the image processing unit 14 includes an optical element/image pickup element correction processing unit 21, a noise reduction processing unit 22, a demosaic processing unit 23, a white balance processing unit 24, a γ correcting unit 25, a Y signal processing unit 26, a line memory 27, a C signal processing unit 28, and a chromatic aberration correcting unit 29.

The optical element/image pickup element correction processing unit 21 is a processing unit to correct an effect of an image pickup element or an optical element, for example, performs digital clamp to adjust a black level or shading correction to correct light falloff at edges of a lens. The optical element/image pickup element correction processing unit 21 obtains the image data (R signal, G signal, and B signal) supplied from the A/D converter 13, performs the above-described correction on the image data, and supplies the corrected image data (R signal, G signal, and B signal) to the noise reduction processing unit 22.

The noise reduction processing unit 22 is a processing unit to perform noise reduction (NR) to reduce noise that occurs at optical conversion by the CCD 12 or at analog transfer of image data by the A/D converter 13. The noise reduction processing unit 22 obtains the image data (R signal, G signal, and B signal) supplied from the optical element/image pickup element correction processing unit 21, performs noise reduction on the image data, and supplies the processed image data (R signal, G signal, and B signal) to the demosaic processing unit 23.

The demosaic processing unit 23 generates a color structure for the R signal, G signal, and B signal that are spatially out-of-phase with respect to each other due to color filters of a Bayer array in the CCD 12, so as to generate an RGB plane signal of three planes (a set of R signal, G signal, and B signal having the same spatial position). In other words, the demosaic processing unit 23 performs a demosaic process on an RGB signal (a set of R signal, G signal, and B signal that are spatially out-of-phase with respect to each other) supplied from the noise reduction processing unit 22, generates a color structure so as to generate an RGB plane signal, and supplies the signal to the white balance processing unit 24.

The white balance processing unit 24 performs a white balance process on respective components of the RGB signal of the same spatial position of the RGB plane signal, multiplies gain so that the RGB levels of a white subject become equal to each other, and supplies the RGB signal to the γ correcting unit 25.

The γ correcting unit 25 corrects a γ value, which is a ratio of change in a voltage equivalent to change in brightness of an image, of the supplied RGB signal (set of R signal, G signal, and B signal). Accordingly, characteristics of elements are absorbed and more natural display can be realized. The γ correcting unit 25 supplies the RGB signal after γ correction to the Y signal processing unit 26 and the C signal processing unit 28.

The Y signal processing unit 26 calculates the following expression (1) by using the RGB signal supplied from the γ correcting unit 25, so as to generate a luminance signal (Y signal).

$$Y=0.3R+0.6G+0.1B \quad (1)$$

In expression (1), Y represents a luminance value (value of the Y signal), R represents a signal level of the R signal (the amount of red component), G represents a signal level of the G signal (the amount of green component) and B represents a signal level of the B signal (the amount of blue component).

The Y signal processing unit 26 supplies the obtained luminance signal (Y signal) to the line memory 27 and the chromatic aberration correcting unit 29.

The line memory 27 includes a volatile semiconductor memory, such as an SRAM (static random access memory) or a DRAM (dynamic random access memory) and functions as a storage unit to temporarily store image data in units of horizontal pixel lines of a screen. The line memory 27 holds predetermined lines of image data (Y signal) supplied from the Y signal processing unit 26 for a predetermined period and outputs the Y signal at the timing corresponding to an output timing of chrominance signals (Cr signal and Cb signal) output from the chromatic aberration correcting unit 29.

The C signal processing unit 28 generates chrominance signals (Cr signal and Cb signal) by calculating the following expressions (2) and (3) by using the RGB signal supplied from the γ correcting unit 25.

$$Cr(R-Y)=0.7R-0.6G-0.1B \quad (2)$$

$$Cb(B-Y)=-0.3R-0.6G+0.9B \quad (3)$$

In expressions (2) and (3), Cr (R−Y) and Cb (B−Y) on the left-hand side represent values of the respective chrominance signals. On the right-hand side, R represents a signal level of the R signal (the amount of red component), G represents a signal level of the G signal (the amount of green component), and B represents a signal level of the B signal (the amount of blue component).

The C signal processing unit 28 supplies the obtained chrominance signals (Cr signal and Cb signal) to the chromatic aberration correcting unit 29.

The chromatic aberration correcting unit 29 corrects axial chromatic aberration or magnification chromatic aberration included in the image data on the basis of the supplied Y signal, Cr signal, and Cb signal, and outputs corrected Cr and Cb signals.

The chromatic aberration correcting unit 29 removes a color of a target pixel when the color of pixels around an overexposed pixel, in which the signal level of the Y signal (or any of the R, G, and B signals) is saturated, is "purple".

An effect of chromatic aberration is significant in a high-contrast image, such as sunshine falling through a tree. In such an image, an effect of correction of chromatic aberration is also significant. In other words, chromatic aberration is obscure in a part free from overexposure, and an effect of correction thereof is small. Typically, a purple color having a small green (G) value has a small luminance (Y) value, and thus the possibility that overexposure occurs near a purple image is very low. In other words, the possibility that an originally-purple image (not due to chromatic aberration) exists near an overexposed area is very low. Therefore, the chromatic aberration correcting unit 29 regards a purple color that appears near an overexposed area as due to chromatic aberration and corrects it (removes color).

In this way, by performing correction while considering an overexposed pixel, the chromatic aberration correcting unit 29 can suppress unnecessary correction and perform more appropriate correction more accurately.

Sometimes, a purple or green color may appear due to an effect of chromatic aberration. Typically, however, a green (G) value is large when a luminance (Y) value is large, and thus the possibility that an originally-green image (not due to chromatic aberration) exists near an overexposed area is high. That is, if a green color is carelessly removed, the color of leaves of a tree may be lost when a picture of sunshine falling through the tree is taken. For this reason, the chromatic aberration correcting unit 29 does not correct a green color.

As described above, the chromatic aberration correcting unit 29 can perform correction more accurately and more appropriately while suppressing unnecessary correction by limiting colors to be corrected.

Figure 2:
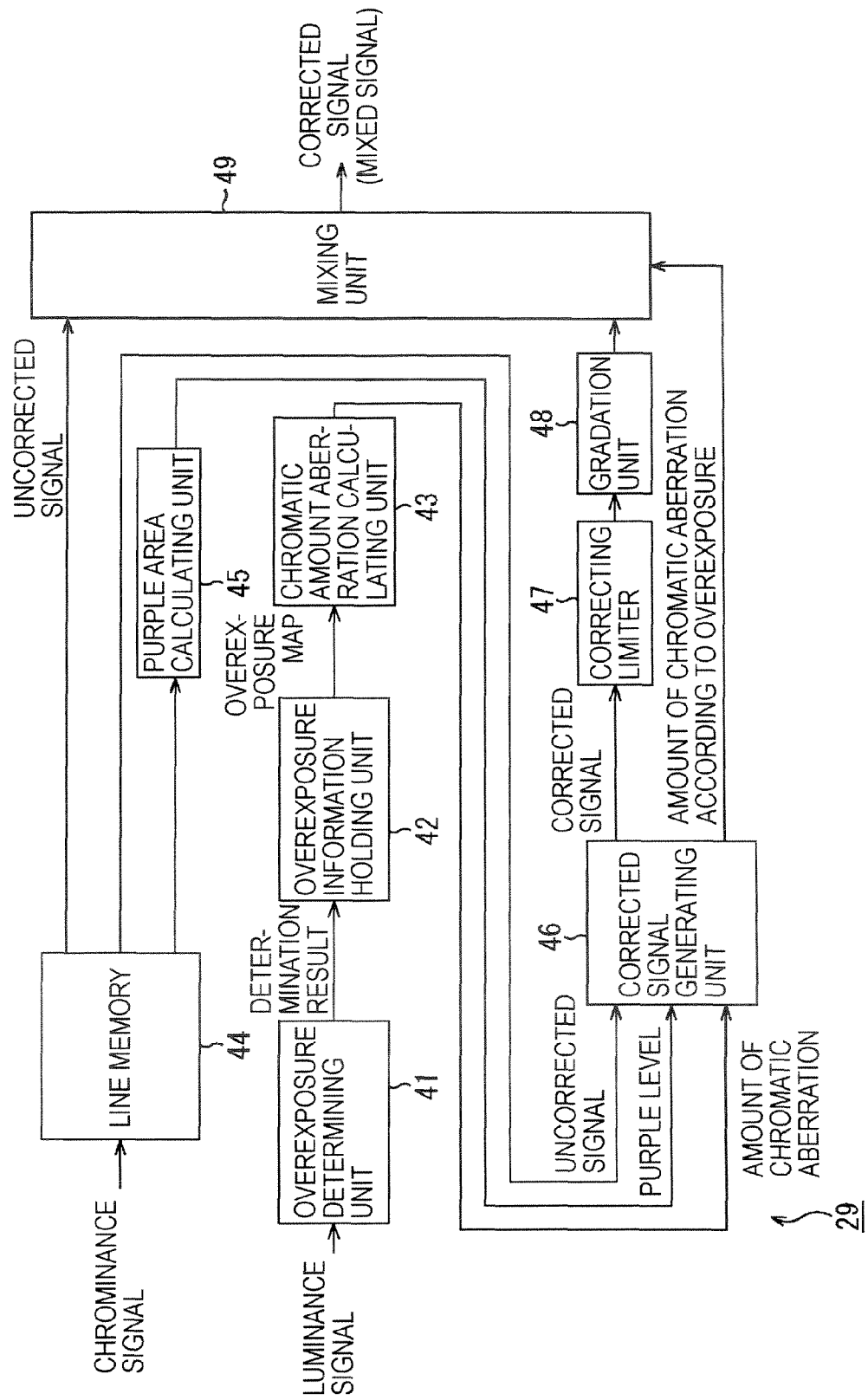
FIG. 2 is a block diagram showing an example of a specific configuration of a chromatic aberration correcting unit shown in FIG. 1.

FIG. 2 is a block diagram showing an example of a specific configuration of the chromatic aberration correcting unit 29 shown in FIG. 1.

In FIG. 2, the chromatic aberration correcting unit 29 includes an overexposure determining unit 41, an overexposure information holding unit 42, a chromatic aberration amount calculating unit 43, a line memory 44, a purple area calculating unit 45, a corrected signal generating unit 46, a correcting limiter 47, a gradation unit 48, and a mixing unit 49.

The overexposure determining unit 41 determines whether the signal level of a luminance signal (Y signal) supplied from the Y signal processing unit 26 (FIG. 1) is at a predetermined threshold or higher (whether the luminance value is saturated) in units of pixels, and supplies a determination result (e.g., information of 1 bit) to the overexposure information holding unit 42. A determining method is described in detail below. For example, the overexposure determining unit 41 generates a value "1" as a determination result for a pixel where overexposure occurs (an overexposed pixel) and supplies the determination result to the overexposure information holding unit 42. Also, the overexposure determining unit 41 generates a value "0" as a determination result for a pixel where overexposure does not occur and supplies the determination result to the overexposure information holding unit 42. Incidentally, the number of bits and a value of information indicating the determination result may be arbitrarily set, but a load can be reduced as the amount of information is smaller.

The overexposure information holding unit 42 includes a storage medium, such as a RAM (random access memory), and has a storage area. The overexposure information holding unit 42 temporarily holds a determination result of each pixel (information indicating whether the pixel is an overexposed pixel) supplied from the overexposure determining unit 41 by using the storage area. The overexposure information holding unit 42 generates an overexposure map showing distribution of overexposed pixels around a target pixel in the chromatic aberration amount calculating unit 43 on the basis of the information held therein and supplies the generated map to the chromatic aberration amount calculating unit 43. The details of the overexposure map are described below.

The chromatic aberration amount calculating unit 43 includes a storage medium, such as a RAM and a ROM (read only memory), and stores a chromatic aberration model in its storage area. The chromatic aberration model is information about the amount of correction of chromatic aberration around a target pixel (the amount of chromatic aberration). The chromatic aberration amount calculating unit 43 generates a chromatic aberration map showing distribution of the amount of chromatic aberration on the basis of the chromatic aberration model. The details of the chromatic aberration model and the chromatic aberration map are described below.

The chromatic aberration amount calculating unit 43 calculates an integration value of the amount of chromatic aberration of the target pixel due to surrounding overexposed pixels by using the chromatic aberration map and the overexposure map supplied from the over exposure information holding unit 42, and supplies the calculated amount of chromatic aberration to the corrected signal generating unit 46.

The line memory 44 includes a storage medium, such as a RAM, and holds chrominance signals (Cr signal and Cb signal) supplied from the C signal processing unit 28 in units of lines of a screen for a predetermined period by using a storage area thereof (holds chrominance signals of a plurality of lines). Then, the line memory 44 supplies part or all of the held chrominance signals to the purple area calculating unit 45, the corrected signal generating unit 46, and the mixing unit 49 at predetermined timings, respectively.

The purple area calculating unit 45 calculates a purple level (the level indicating approximation to a purple color) of each pixel on the basis of the chrominance signals (Cr signal and Cb signal) supplied from the line memory 44 and supplies a calculation result to the corrected signal generating unit 46. That is, the purple area calculating unit 45 specifies a purple part (purple area) in the screen. The details of the calculating method are described below.

The corrected signal generating unit 46 calculates the amount of chromatic aberration according to the above-described overexposure (the amount of correction of chromatic aberration to purple pixels near an overexposed pixel) on the basis of the amount of chromatic aberration supplied from the chromatic aberration amount calculating unit 43 and the purple level supplied from the purple area calculating unit 45. Then, the corrected signal generating unit 46 performs chromatic aberration correction on the uncorrected chrominance signals supplied from the line memory 44 by using the value of the amount of chromatic aberration, so as to generate a corrected signal. The details of correction of chromatic aberration are described below. The corrected signal generating unit 46 supplies the generated corrected signal to the correcting limiter 47. Also, the corrected signal generating unit 46 supplies the amount of chromatic aberration according to overexposure to the mixing unit 49.

The correcting limiter 47 performs correction of the amount of reduction in chroma on the corrected signal supplied from the corrected signal generating unit 46. More specifically, the correcting limiter 47 detects a part where the chroma has too much been reduced by the correcting process in the corrected signal generating unit 46 and performs a chroma correcting process with reference to the chroma of surrounding pixels.

The correcting limiter 47 performs the correcting process by selecting a pixel on which a chroma reducing process has been performed by the corrected signal generating unit 46, that is, a pixel on which chromatic aberration correction has been performed, as a target pixel. In the chroma correction, a pixel whose chroma reduction rate is not 0 (zero) is selected because the area to be corrected has reduced chroma. Therefore, the correcting limiter 47 obtains information about a chroma reduction rate (not shown) together with the corrected signal, and performs chroma correction on pixels whose chroma reduction rate is not 0 (zero). The correcting limiter 47 supplies the corrected signal on which chroma correction has been done to the gradation unit 48.

The gradation unit 48 performs a gradation process on the signal supplied from the correcting limiter 47 by using a low-pass filter (LPF) so as to correct uneven correction. Then, the gradation unit 48 supplies the corrected signal to the mixing unit 49.

As described above, unnatural and conspicuous correction in the image can be reduced by further processing the corrected signal by the correcting limiter 47 and the gradation unit 48, so that the chromatic aberration correcting unit 29 can obtain more natural chromatic aberration correction result.

The mixing unit 49 mixes the uncorrected signal supplied from the line memory 44 and the corrected signal supplied from the gradation unit 48 on the basis of the amount of chromatic aberration according to overexposure supplied from the corrected signal generating unit 46 so as to generate a corrected signal (mixed signal), and outputs the mixed signal. That is, the mixing unit 49 determines a mixture ratio of the two signals on the basis of the amount of chromatic aberration and mixes the two signals (corrected signal and uncorrected signal) so that the corrected signal is emphasized in a pixel in which chromatic aberration has been corrected and that the uncorrected signal is emphasized in a pixel in which chromatic aberration correction is not performed. By mixing the two signals, the mixing unit 49 can allow the uncorrected signal to be reflected on the signal in which chromatic aberration has been corrected, so that a more natural corrected signal can be obtained. The details of the mixing process are described below.

FIG. 3 is a block diagram showing an example of a specific configuration of the overexposure determining unit 41 shown in FIG. 2.

In FIG. 3, the overexposure determining unit 41 includes an overexposed pixel threshold determining unit 61, an overexposed pixels determining unit 62, and a determination result holding unit 63.

The overexposed pixel threshold determining unit 61 refers to the luminance value of each pixel on the basis of the input luminance signal (Y signal), determines whether the luminance value is larger than a predetermined threshold (whether the signal level has been saturated), and supplies a determination result (threshold determination result) to the overexposed pixels determining unit 62. Any value may be used as the threshold. However, since the threshold is used for detecting an overexposed pixel, a sufficiently large value approximate to a maximum of a range width of the luminance value is typically set.

The overexposed pixels determining unit 62 supplies the determination result supplied from the overexposed pixel threshold determining unit 61 to the determination result holding unit 63, so that the determination result is held therein. Also, the overexposed pixels determining unit 62 determines whether the target pixel is an overexposed pixel on the basis of the supplied determination result. If the target pixel is an overexposed pixel, the overexposed pixels determining unit 62 obtains a determination result of the surrounding pixels from the determination result holding unit 63 and determines whether an overexposed pixel exists near the target pixel. That is, the overexposed pixels determining unit 62 detects a plurality of overexposed pixels that are sequentially aligned or that are adjoining to each other. Then, the overexposed pixels determining unit 62 supplies the obtained determination result (information about the plurality of pixels that are sequentially aligned or that are adjoining to each other) as an overexposure determination result to the overexposure information holding unit 42.

Overexposure occurs, for example, when a light source is shot. Typically, the overexposure occurs over a plurality of pixels, and the possibility that overexposure occurs in only one pixel is very low. In other words, overexposure occurred in only one pixel is due to a defect pixel with high possibility. Thus, the overexposed pixels determining unit 62 ignores overexposure in only one pixel and detects overexposure over a plurality of pixels, so as to suppress wrong detection due to a defect pixel, as described above.

In this way, the overexposure determining unit 41 not only performs threshold determination in the overexposed pixel threshold determining unit 61 but also determines the existence of surrounding overexposed pixels in the overexposed pixels determining unit 62. Accordingly, overexposed pixels can be detected more accurately.

The determination result holding unit 63 may hold any information as long as it can substantially hold a determination result (e.g., information of 1 bit) of each pixel near the target pixel (in a predetermined range). For example, the determination result holding unit 63 may hold all determination results of respective pixels that can be a nearby pixel of the target pixel and may discard determination results of pixels one after another after they have lost the possibility of being a nearby pixel. Alternatively, the determination result holding unit 63 may hold address information of pixels that have been determined to be an overexposed pixel. A holding method and information to be held are arbitrarily set. For example, an optimal method may be used on the basis of the amount of information to be held and a load of processing.

FIG. 4 is a block diagram showing an example of a specific configuration of the chromatic aberration amount calculating unit 43 shown in FIG. 2.

In FIG. 4, the chromatic aberration amount calculating unit 43 includes a chromatic aberration model holding unit 71, a chromatic aberration map generating unit 72, a chromatic aberration map holding unit 73, a magnification chromatic aberration information holding unit 74, a magnification chromatic aberration correcting unit 75, and a map correcting unit 76.

The chromatic aberration model holding unit 71 includes a ROM and a RAM, and holds a chromatic aberration model in its storage area in advance. The chromatic aberration model is model information to generate a chromatic aberration map. The chromatic aberration map indicates an effect of aberration on pixels around an overexposed pixel.

In other words, the chromatic aberration map is information indicating distribution of the amount of chromatic aberration (the level of chromatic aberration) due to overexposure that occurs around an overexposed pixel. The chromatic aberration model may be any information as long as it can be used to generate the chromatic aberration map.

The details of the chromatic aberration map are described below. For example, the chromatic aberration model may be table information indicating a relationship between a distance from an overexposed pixel and the amount of chromatic aberration. The chromatic aberration map may be map information that is calculated on the basis of the table information and that indicates the amount of chromatic aberration of each pixel around an overexposed pixel. Alternatively, the chromatic aberration model may be part or whole of the chromatic aberration map (map information).

The chromatic aberration model holding unit 71 supplies the chromatic aberration model to the chromatic aberration map generating unit 72 in response to a request from the chromatic aberration map generating unit 72.

The chromatic aberration map generating unit 72 generates the above-described chromatic aberration map by using the chromatic aberration model supplied from the chromatic aberration model holding unit 71 and supplies the map to the chromatic aberration map holding unit 73.

The chromatic aberration map holding unit 73 includes a RAM, temporarily holds the chromatic aberration map supplied from the chromatic aberration map generating unit 72 in its storage area, and supplies the chromatic aberration map to the map comparing unit 76 in response to a request from the map comparing unit 76.

The magnification chromatic aberration information holding unit 74 includes a ROM and a RAM and holds magnification chromatic aberration information in its storage area in advance. The information indicates the amount of magnification chromatic aberration occurring in each pixel of a screen. Although details are described below, magnification chromatic aberration, which occurs due to a difference in wavelengths and appears as a difference in image magnification, occurs significantly at periphery of a screen. Magnification chromatic aberration information indicates a relationship between a position in the screen and the amount of magnification chromatic aberration, and may be any types of information, e.g., table information or an arithmetic expression. The magnification chromatic aberration information holding unit 74 supplies the magnification chromatic aberration information to the magnification chromatic aberration correcting unit 75 in response to a request from the magnification chromatic aberration correcting unit 75.

The magnification chromatic aberration correcting unit 75 obtains the magnification chromatic aberration information from the magnification chromatic aberration information holding unit 74, refers to the information, and determines whether magnification chromatic aberration occurs in a target pixel in the map comparing unit 76. If magnification chromatic aberration occurs, the magnification chromatic aberration correcting unit 75 corrects the chromatic aberration map held in the chromatic aberration map holding unit 73 on the basis of the magnification chromatic aberration information. The chromatic aberration map holding unit 73 supplies the corrected chromatic aberration map to the map comparing unit 76 so as to process the target pixel.

In this way, the chromatic aberration map holding unit 73 supplies the chromatic aberration map for each pixel to the map comparing unit 76.

The map comparing unit 76 performs matching between the chromatic aberration map and the overexposure map supplied from the overexposure information holding unit 42 (FIG. 2) so as to calculate the amount of chromatic aberration corresponding to overexposure of each pixel, and supplies a calculation result to the corrected signal generating unit 46. The details of the map comparing unit 76 are described below.

At this time, the amount of correction may be determined with respect to a distance from a pixel to be corrected (target pixel) to the nearest overexposed pixel. However, the amount of chromatic aberration is actually determined depending on a high-contrast subject area around the target pixel. Therefore, the map comparing unit 76 can calculate the amount of chromatic aberration more easily and more accurately by determining the amount of correction by integrating all overexposure information than by calculating the amount of correction on the basis of a distance to the nearest overexposed pixel.

Also, the chromatic aberration amount calculating unit 43 can calculate the amount of chromatic aberration more accurately by taking the magnification chromatic aberration into consideration.

Figure 5:
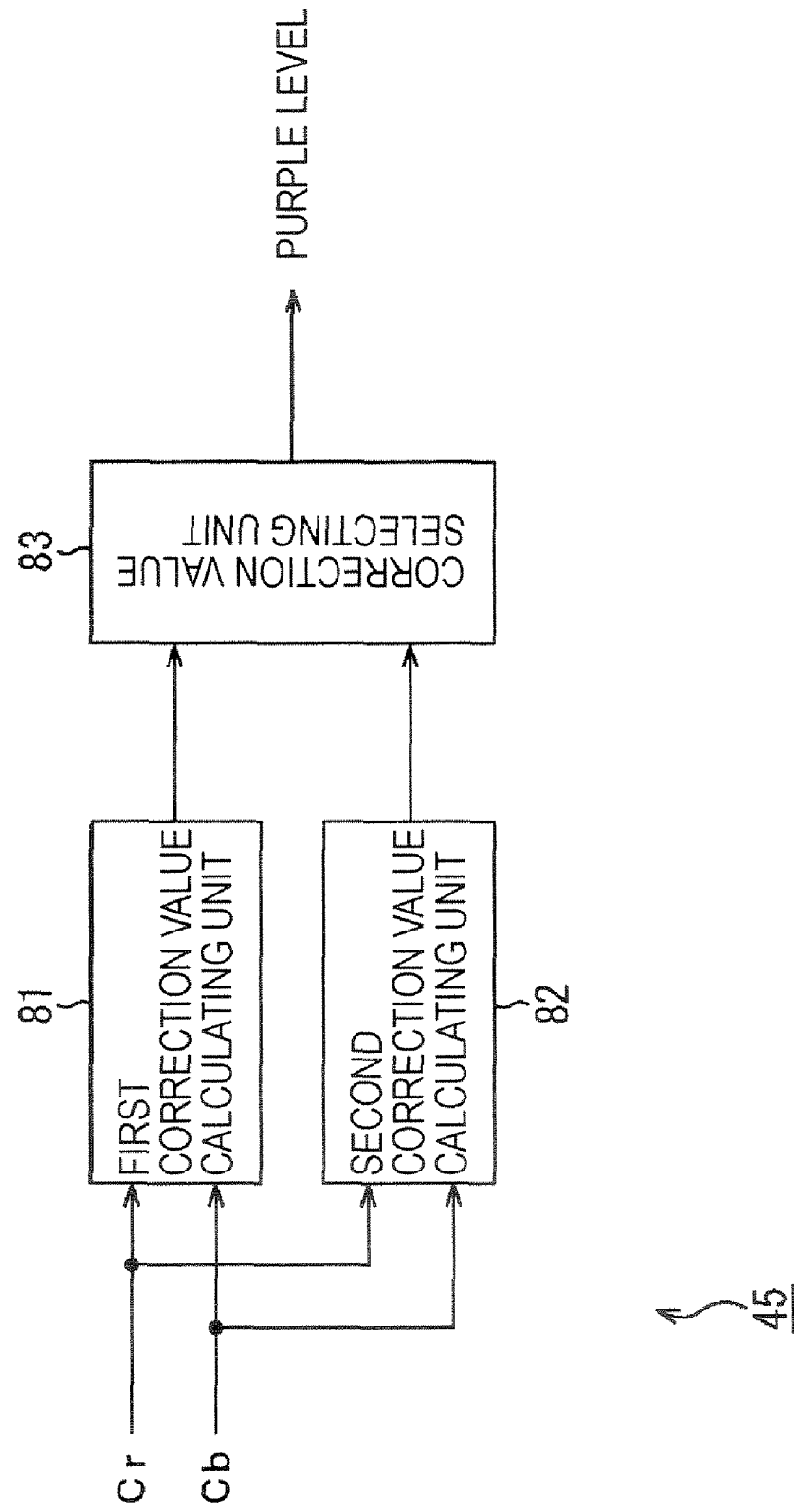
FIG. 5 is a block diagram showing an example of a specific configuration of a purple area calculating unit shown in FIG. 2.

FIG. 5 is a block diagram showing an example of a specific configuration of the purple area calculating unit 45 shown in FIG. 2.

In FIG. 5, the purple area calculating unit 45 includes a first correction value calculating unit 81, a second correction value calculating unit 82, and a correction value selecting unit 83.

The purple area calculating unit 45 detects a purple color of a pixel to be corrected and outputs such a value (purple level) that a large weight is put on the purple area. At that time, the purple area calculating unit 45 calculates two correction values on the basis of chrominance signal values by using two correction expressions and selects one of them, as described below.

The first correction value calculating unit 81 calculates one of the correction values (first correction value) by using one of the correction expressions on the basis of a Cr signal and a Cb signal, and supplies the first correction value to the correction value selecting unit 83. Likewise, the second correction value calculating unit 82 calculates the other correction value (second correction value) by using the other correction expression on the basis of the Cr signal and the Cb signal, and supplies the second correction value to the correction value selecting unit 83.

The correction value selecting unit 83 selects a smaller value from among the first correction value supplied from the first correction value calculating unit 81 and the second correction value supplied from the second correction value calculating unit 82, and outputs the selected value as a purple level.

That is, the two correction expressions used by the first correction value calculating unit 81 and the second correction value calculating unit 82 (the details are described below) are expressions to weight a purple color.

According to the above description, the purple area calculating unit 45 calculates the purple level by using expressions. However, the method for calculating the purple level is not limited to this. For example, the purple area calculating unit 45 may calculate the purple level on the basis of table information.

Figure 6:
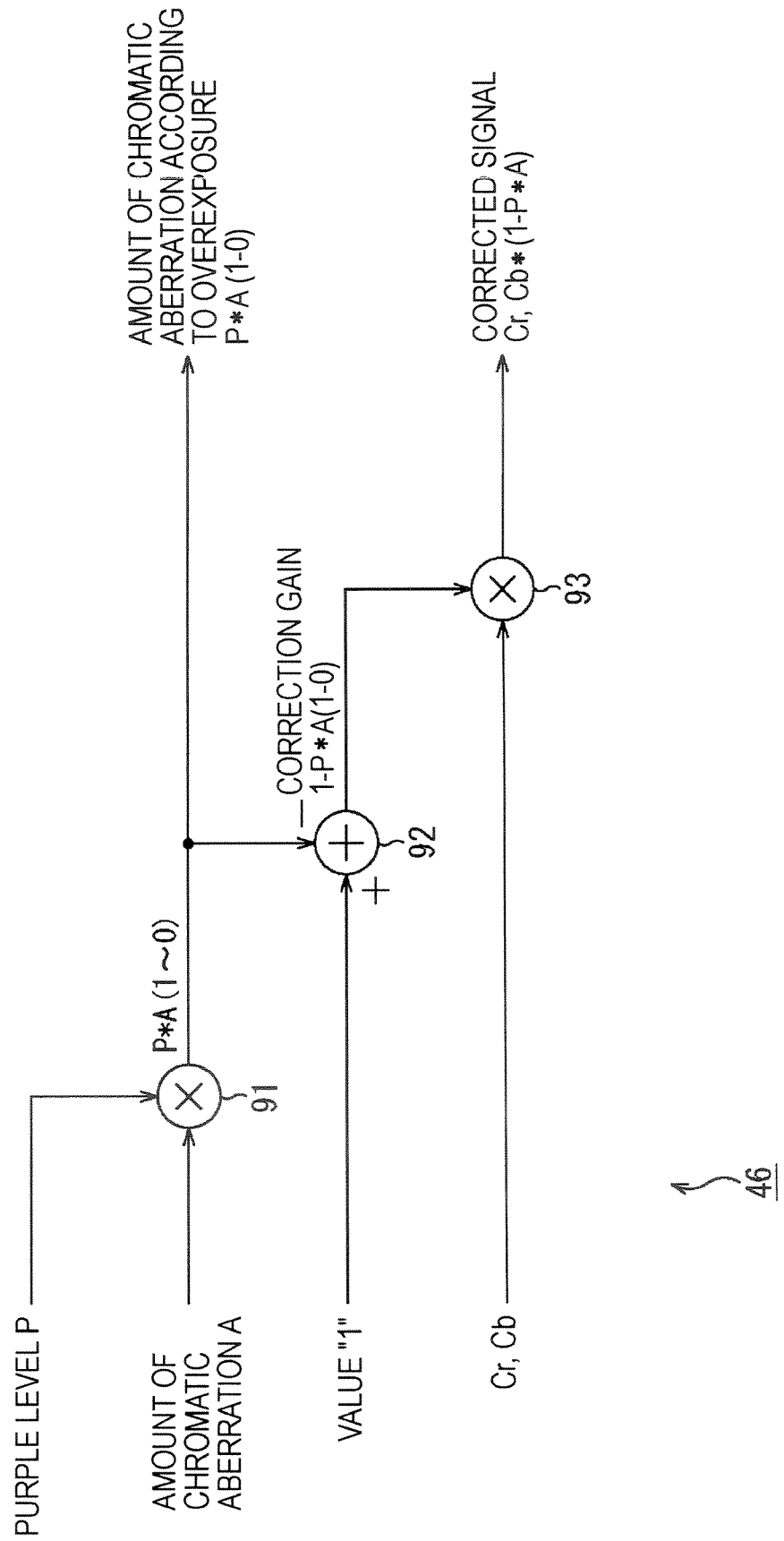
FIG. 6 is a block diagram showing an example of a specific configuration of a corrected signal generating unit shown in FIG. 2.

FIG. 6 is a block diagram showing an example of a specific configuration of the corrected signal generating unit 46 shown in FIG. 2.

In FIG. 6, the corrected signal generating unit 46 includes a multiplier 91, a subtractor 92, and a multiplier 93.

The multiplier 91 multiplies a purple level P by the amount of chromatic aberration A and supplies a multiplication result, that is, the amount of chromatic aberration (achromatic gain) according to overexposure $P*A$ ($0 \leq P*A \leq 1$) to the subtractor 92 and the mixing unit 49 (FIG. 2).

The subtractor 92 subtracts the amount of chromatic aberration $P*A$ according to overexposure from a value "1" so as to invert the amount of chromatic aberration $P*A$ according to overexposure and to obtain a correction gain $1-P*A$ ($0 \leq P*A \leq 1$). Then, the subtractor 92 supplies the correction gain $1-P*A$ to the multiplier 93.

The multiplier 93 multiplies the signal values (Cr and Cb) of chrominance signals by the correction gain $1-P*A$ so as to calculate $Cr*(1-P*A)$ and $Cb*(1-P*A)$. Then, the multiplier 93 supplies the calculation result as corrected signals to the correcting limiter 47.

That is, due to multiplication of the purple level P by the amount of chromatic aberration A performed by the multiplier 91, the amount of chromatic aberration (according to overexposure) of the target pixel can be set to large with respect to pixels in a purple area (the area that is likely to be a purple area generated by chromatic aberration and where the amount of aberration is large) existing near an overexposed pixel.

Also, by inverting the amount of chromatic aberration P*A according to the overexposure and multiplying the signal values (Cr and Cb) of chrominance signals by the correction gain 1−P*A by using the subtractor 92 and the multiplier 93, the corrected signal generating unit 46 can correct the chrominance signals in accordance with the amount of chromatic aberration set by the multiplier 91.

With this configuration, the corrected signal generating unit 46 can correct chromatic aberration with a simpler configuration more easily and more accurately.

Figure 7:
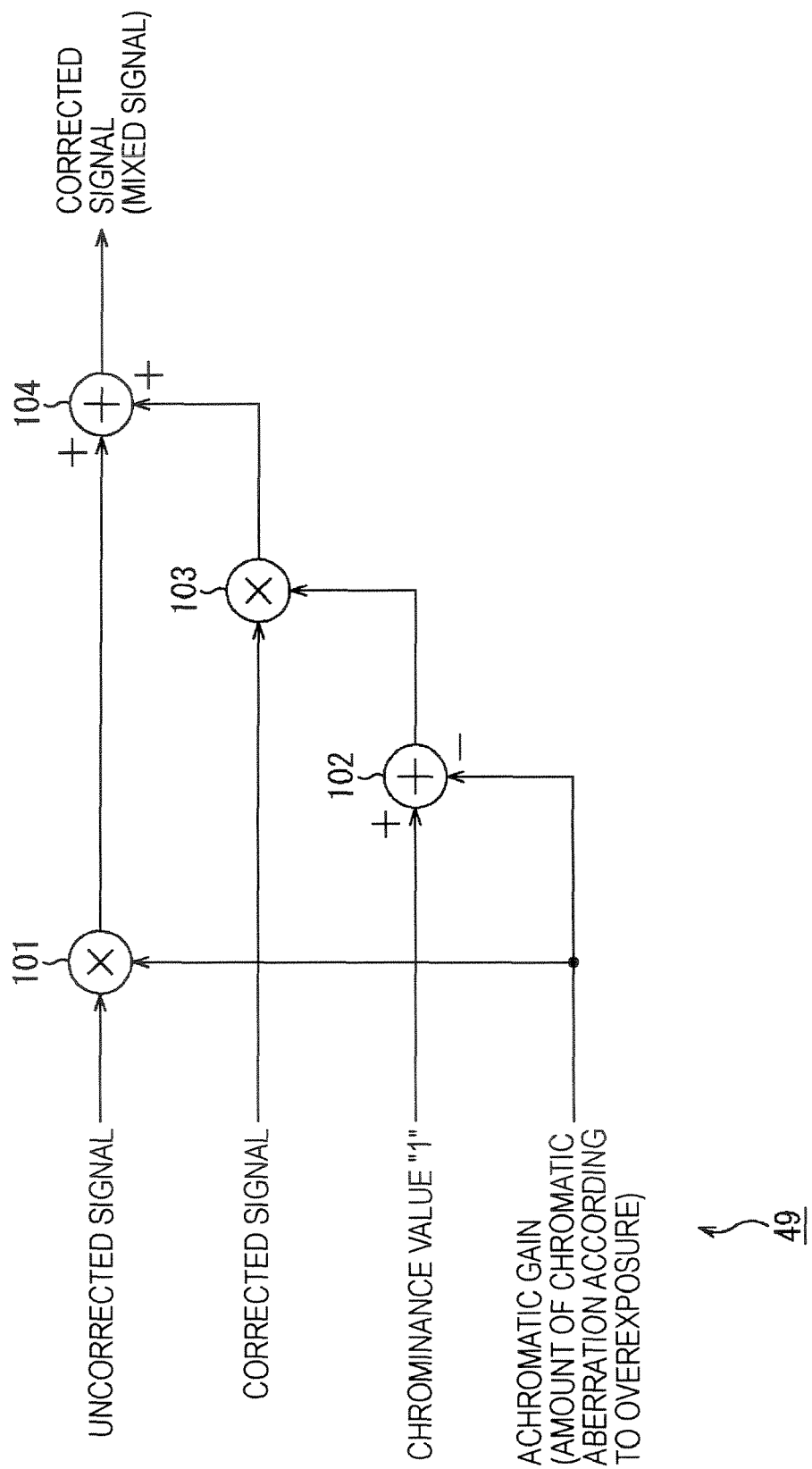
FIG. 7 is a block diagram showing an example of a specific configuration of a mixing unit shown in FIG. 2.

FIG. 7 is a block diagram showing an example of a specific configuration of the mixing unit 49 shown in FIG. 2.

In FIG. 7, the mixing unit 49 includes a multiplier 101, a subtractor 102, a multiplier 103, and an adder 104.

The multiplier 101 multiplies an uncorrected signal by the achromatic gain (the amount of chromatic aberration according to overexposure) P*A and supplies a multiplication result to the adder 104.

The subtractor 102 subtracts the achromatic gain P*A from a value "1" so as to invert the achromatic gain P*A and to obtain a correction gain 1−P*A, and supplies the correction gain 1−P*A to the multiplier 103.

The multiplier 103 multiplies the corrected signal supplied from the multiplier 101 by the correction gain 1−P*A, which is an inverted value of the achromatic gain P*A, and supplies a multiplication result to the adder 104.

The adder 104 adds the multiplication result generated by the multiplier 101 and the multiplication result generated by the multiplier 103, and outputs an addition result as a corrected signal (mixed signal).

That is, the mixing unit 49 allows the multipliers 101 and 103 to perform weighting on the uncorrected signal and the corrected signal in accordance with the value of achromatic gain and allows the adder 104 to add (mix) those values, so that the corrected signal (mixed signal) is generated. Accordingly, the chromatic aberration correcting unit 29 can reflect an image before correction on the corrected image, so that a more natural and appropriate chromatic aberration correction result can be obtained.

Hereinafter, processes performed by the above-described units are described.

First, an example of entire image processing performed by the image processing unit 14 shown in FIG. 1 is described with reference to the flowchart shown in FIG. 8.

The image processing unit 14 starts image processing upon being supplied with an image signal (digital data) from the A/D converter 13. After the image processing has started, the optical element/image pickup element correction processing unit 21 performs an optical element/image pickup element correction process on the image signal in step S1. In step S2, the noise reduction processing unit 22 performs a noise reduction process on the image signal. In step S3, the demosaic processing unit 23 performs a demosaic process on the image signal. In step S4, the white balance processing unit 24 performs a white balance process on the image signal. In step S5, the γ correcting unit 25 performs a γ correction process on the image signal.

After the γ correction process has been done, the Y signal processing unit 26 generates a luminance signal (Y signal) on the basis of the γ-corrected image signal (RGB signal) in step S6. The line memory 27 holds the luminance signal (Y signal) in step S7. The C signal processing unit 28 generates chrominance signals (Cr signal and Cb signal) on the basis of the γ-corrected image signal (RGB signal) in step S8.

In step S9, the chromatic aberration correcting unit 29 performs a chromatic aberration correcting process in order to correct chromatic aberration of the chrominance signals generated by the C signal processing unit 28 by using the luminance signal generated by the Y signal processing unit 26. The details of the chromatic aberration correcting process are described below with reference to the flowchart shown in FIG. 9. After the chromatic aberration correcting process has been done, the line memory 27 and the chromatic aberration correcting unit 29 output the luminance signal and the chrominance signals to the outside of the image processing unit 14 while associating the signals, and then the image processing ends.

The image processing unit 14 repeats the above-described image processing so as to process image signals supplied from the A/D converter 13. In this way, the image processing unit 14 can perform chromatic aberration correction on image signals more accurately and more easily.

Figure 8:
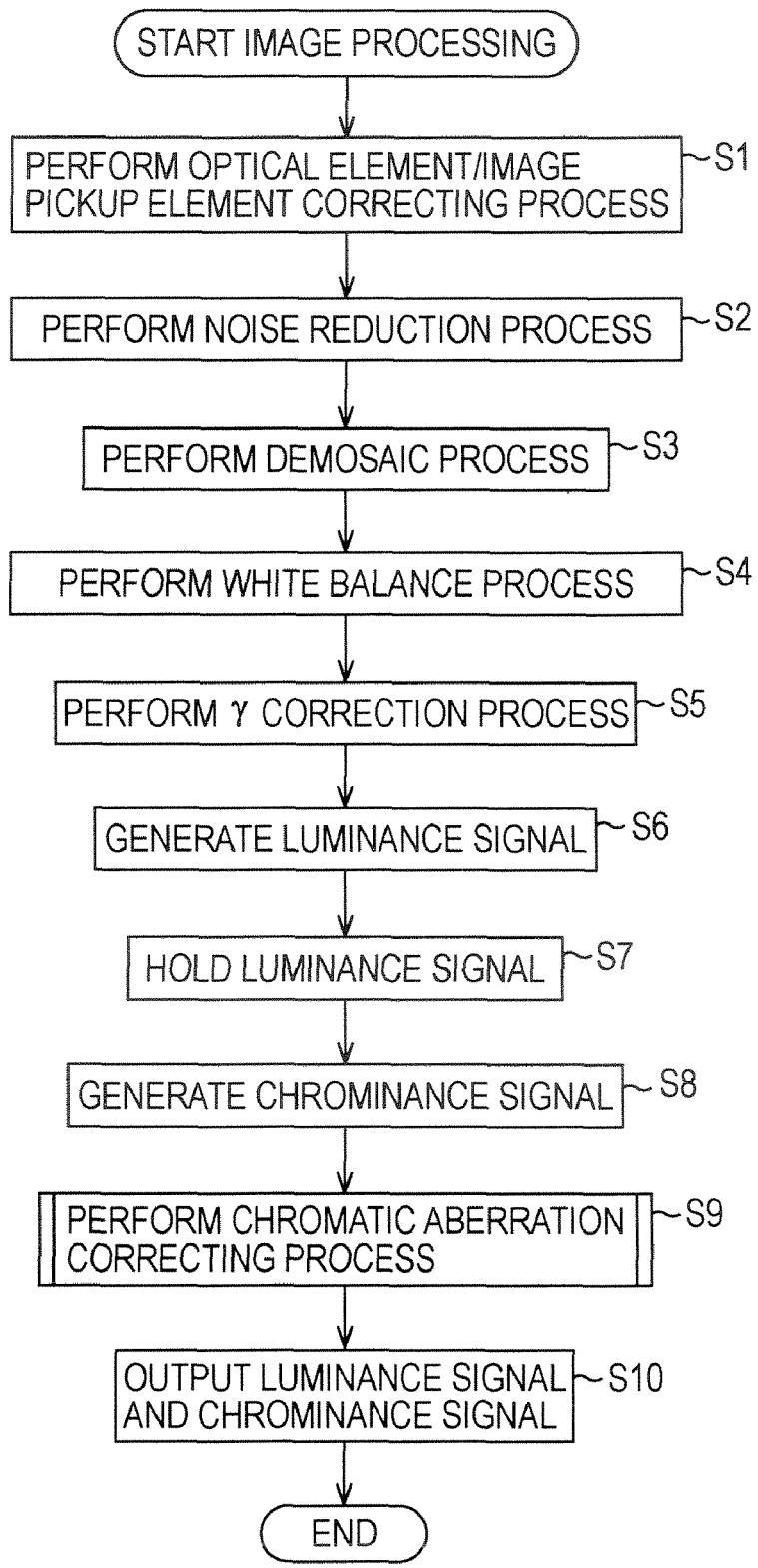
FIG. 8 is a flowchart illustrating an example of image processing.

Now, the details of the chromatic aberration correcting process performed in step S9 shown in FIG. 8 are described with reference to the flowchart shown in FIG. 9. FIG. 10 is also referred to as necessary.

After the chromatic aberration correcting process has started, the overexposure determining unit 41 performs an overexposure determining process on the luminance signal (Y signal) supplied from the Y signal processing unit 26 in step S21. The details of the overexposure determining process are described below with reference to the flowchart shown in FIG. 11. After the overexposure determining process, the overexposure information holding unit 42 holds the determination result in step S22, and generates an overexposure map shown in FIG. 10 about a target pixel of the chromatic aberration amount calculating process performed by the chromatic aberration amount calculating unit 43 in step S23.

FIG. 10 is a schematic view illustrating an example of a configuration of the overexposure map.

In FIG. 10, the overexposure map 111 serves as map information showing distribution of overexposed pixels 113 near a target pixel 112. In the example shown in FIG. 10, the overexposure map 111 is map information of 9 pixels×9 pixels, with the target pixel 112 being the center. The coordinates of the target pixel are (0, 0). An x-coordinate is set in the horizontal direction: −4, −3, −2, . . . , and 4 from the left to the right. Also, a y-coordinate is set in the vertical direction: −4, −3, −2, . . . , and 4 from the bottom to the top. That is, the overexposure map 111 includes relative coordinate information of overexposed pixels in a predetermined range with respect to the target pixel. In this case, the coordinates of the overexposed pixel 113 are (2, 2).

In an image signal processed in the image processing unit 14, groups of pixel values, each group corresponding to one line from the left-end pixel to the right-end pixel, are aligned from the top line to the bottom line. That is, the image signal is processed so as to proceed one pixel by one in the right direction from the top left-end pixel of an image and one line by one downward.

The overexposure information holding unit 42 holds determination results in accordance with this processing order. Thus, the pixel arrangement of the overexposure map 111 shown in FIG. 10 corresponds to an image of an image signal to be processed (the horizontal direction is inverted). That is, the overexposure map 111 shown in FIG. 10 is a matrix of a determination result. In the overexposure map 111, a determination result is newer as the coordinate values are smaller (the left side in the horizontal direction and the bottom side in the vertical direction).

The overexposure map may be any information as long as it holds information equivalent to the information shown in FIG. 10.

Referring back to FIG. 9, the overexposure information holding unit 42 that has generated the above-described overexposure map supplies the overexposure map to the chromatic aberration amount calculating unit 43. After obtaining the overexposure map, the chromatic aberration amount calculating unit 43 performs a chromatic aberration amount calculating process in step S24. The details of the chromatic aberration amount calculating process are described below with reference to the flowchart shown in FIG. 12.

In step S25, the purple area calculating unit 45 obtains chrominance signals from the line memory 44 and performs a purple area calculating process. The details of the purple area calculating process are described below with reference to the flowchart shown in FIG. 17.

In step S26, the corrected signal generating unit 46 performs a corrected signal generating process. The details of the corrected signal generating process are described below with reference to the flowchart shown in FIG. 19. After the corrected signal generating process, the correcting limiter 47 performs a correcting limiter process on the corrected signal in step S27, and the gradation unit 48 performs a gradation process in step S28.

In step S29, the mixing unit 49 mixes the uncorrected signal and the corrected signal on the basis of the amount chromatic aberration according to overexposure (achromatic gain). The details of the mixing process are described below with reference to the flowchart shown in FIG. 20. After the mixing process has been done and the corrected signal has been output, the chromatic aberration correcting unit 29 ends the chromatic aberration correcting process. Then, the process returns to step S9 shown in FIG. 8 and step S10 is performed.

Next, the details of the respective processes shown in FIG. 9 are described. First, the details of the overexposure determining process performed in step S21 shown in FIG. 9 are described with reference to the flowchart shown in FIG. 11.

The overexposure determining unit 41 starts the overexposure determining process after being supplied with a luminance signal. After the overexposure determining process has started, the overexposed pixel threshold determining unit 61 determines overexposure of a target pixel to be processed by using a threshold in step S41. That is, the overexposed pixel threshold determining unit 61 compares the luminance value of the target pixel of the input luminance signal with a predetermined threshold held in advance and determines whether the target pixel can be an overexposed pixel (whether the luminance value has been saturated).

In step S42, the determination result holding unit 63 obtains a threshold determination result about the target pixel via the overexposed pixels determining unit 62 and holds the result. In step S43, the overexposed pixels determining unit 62 determines whether the target pixel has been determined to be an overexposed pixel by the overexposed pixel threshold determining unit 61 on the basis of the threshold determination result. If the target pixel has been determined to be an overexposed pixel, the process proceeds to step S44, where the overexposed pixels determining unit 62 obtains determination results of pixels near the target pixel (nearby pixels: in the example shown in FIG. 10, 9×9 pixels with the target pixel being the center) from the determination result holding unit 63.

After obtaining the determination results of the nearby pixels, the overexposed pixels determining unit 62 determines whether an overexposed pixel exists near the target pixel on the basis of the determination results in step S45. If an overexposed pixel exists, the process proceeds to step S46, where the target pixel is determined to be an overexposed pixel and the determination result is supplied to the overexposure information holding unit 42. After supplying the determination result, the overexposed pixels determining unit 62 ends the overexposure determining process. Then, the process returns to step S21 shown in FIG. 9, and step S22 and the subsequent steps are performed.

If the overexposed pixels determining unit 62 determines in step S45 that no overexposed pixel exists near the target pixel, the process proceeds to step S47, where the overexposed pixels determining unit 62 ignores the target pixel as a defect pixel and supplies the determination result to the overexposure information holding unit 42. After supplying the determination result, the overexposed pixels determining unit 62 ends the overexposure determining process. Then, the process returns to step S21 shown in FIG. 9, and step S22 and the subsequent steps are performed.

If the overexposed pixel threshold determining unit 61 determines in step S43 that the target pixel is not an overexposed pixel, the process proceeds to step S48, where the overexposed pixels determining unit 62 determines the target pixel not to be an exposed pixel, ignores the target pixel, and supplies the determination result to the overexposure information holding unit 42. After supplying the determination result, the overexposed pixels determining unit 62 ends the overexposure determining process. Then, the process returns to step S21 shown in FIG. 9, and step S22 and the subsequent steps are performed.

As described above, the overexposure determining unit 41 can ignore overexposure of a defect pixel by determining whether a target pixel is an overexposed pixel by considering not only a threshold determination result of the target pixel but also a determination result of nearby pixels. Accordingly, an overexposed pixel can be detected more accurately. That is, the chromatic aberration correcting unit 29 can correct chromatic aberration more accurately by using a detection result of an overexposed pixel.

Next, the details of the chromatic aberration amount calculating process performed in step S24 shown in FIG. 9 are described with reference to the flowchart shown in FIG. 12. FIGS. 13 to 16 are also referred to as necessary.

Figure 13:
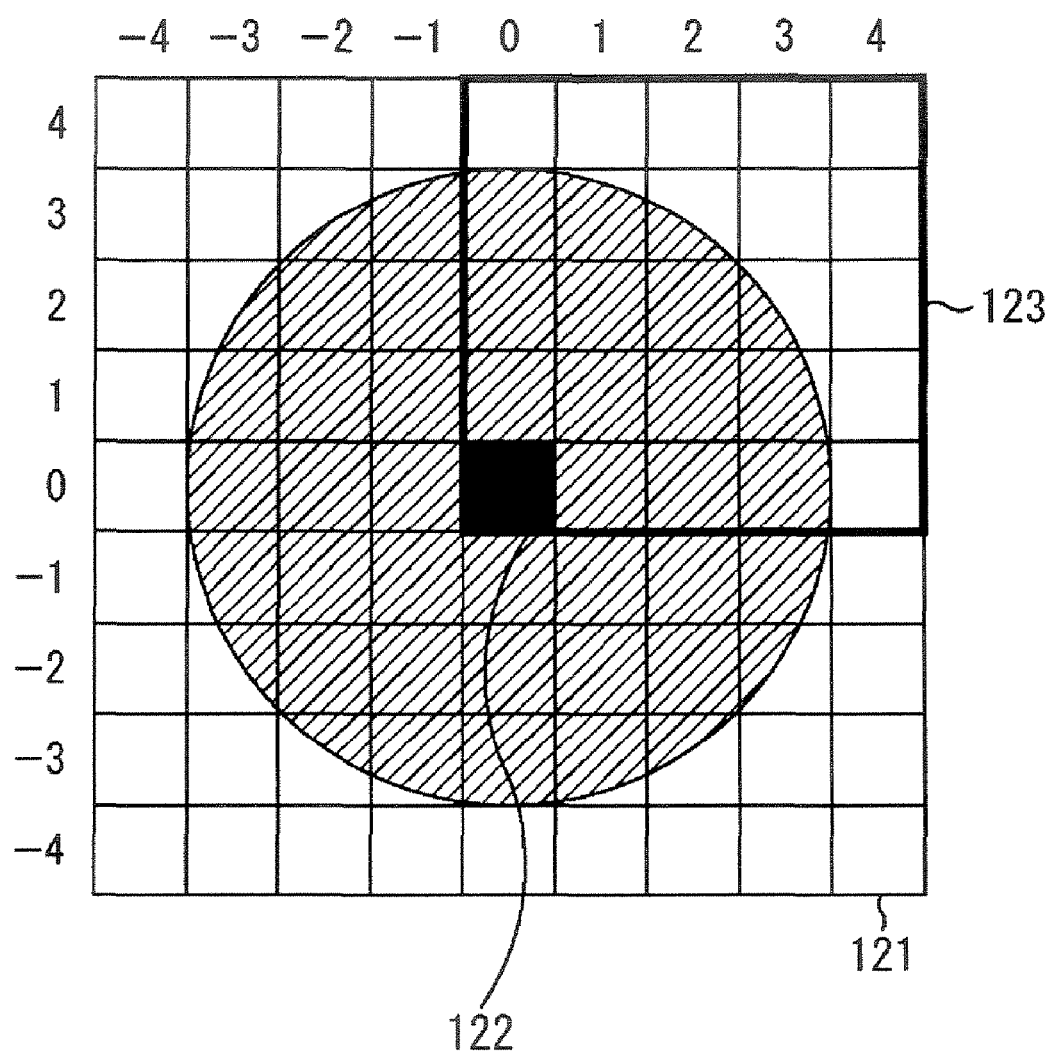
FIG. 13 is a schematic view illustrating an example of a configuration of a chromatic aberration map.

After the chromatic aberration amount calculating process has started, the chromatic aberration map generating unit 72 obtains a chromatic aberration model from the chromatic aberration model holding unit 71 in step S61, and generates the chromatic aberration map shown in FIG. 13 on the basis of the chromatic aberration model in step S62.

FIG. 13 is a schematic view illustrating an example of a configuration of the chromatic aberration map.

In FIG. 13, a chromatic aberration map 121 is map information showing distribution of the amount of chromatic aberration around a target pixel. As the overexposure map 111 shown in FIG. 10, the chromatic aberration map 121 is map information of 9 pixels×9 pixels, with the target pixel to be processed being the center. Note that, in the chromatic aberration map 121, an amount of chromatic aberration is assigned to each of the 9 pixels×9 pixels. That is, in the example shown in FIG. 13, the chromatic aberration map 121 includes 81 pieces of information about the amount of chromatic aberration arranged in a matrix pattern of 9×9.

The chromatic aberration map may be part of the chromatic aberration map 121, as inside of a frame 123 shown in FIG.

13. In that case, the amount of information of the chromatic aberration map can be reduced, a load of each process using the chromatic aberration map can be reduced, and the size of a circuit and manufacturing/operating cost can be reduced. As described below, this chromatic aberration map is used by being matched (positioned) with the overexposure map 111 shown in FIG. 10. However, if only the information inside the frame 123 is used as the chromatic aberration map, matching can be realized by performing coordinate transformation.

Referring back to FIG. 12, after the chromatic aberration map has been generated, the chromatic aberration map holding unit 73 obtains and holds the map in step S63. In step S64, the map comparing unit 76 obtains the overexposure map of the target pixel from the overexposure information holding unit 42. The overexposure information holding unit 42 extracts determination results of pixels near the target pixel in the map comparing unit 76 from a group of determination results supplied from the overexposure determining unit 41, generates an overexposure map of the target pixel, and supplies the overexposure map to the map comparing unit 76 at predetermined timing. The map comparing unit 76 obtains the overexposure map. Alternatively, the map comparing unit 76 may request the overexposure map to the overexposure information holding unit 42, which may supply the overexposure map to the map comparing unit 76 in response to the request.

In step S65, the magnification chromatic aberration correcting unit 75 obtains magnification chromatic aberration information from the magnification chromatic aberration information holding unit 74. Magnification chromatic aberration occurs due to a difference in wavelengths of respective colors and appears as a difference in magnification of images. Due to the magnification chromatic aberration, distortion occurs in distribution of chromatic aberration near a corner of an image, as shown in FIG. 14.

Figure 14:
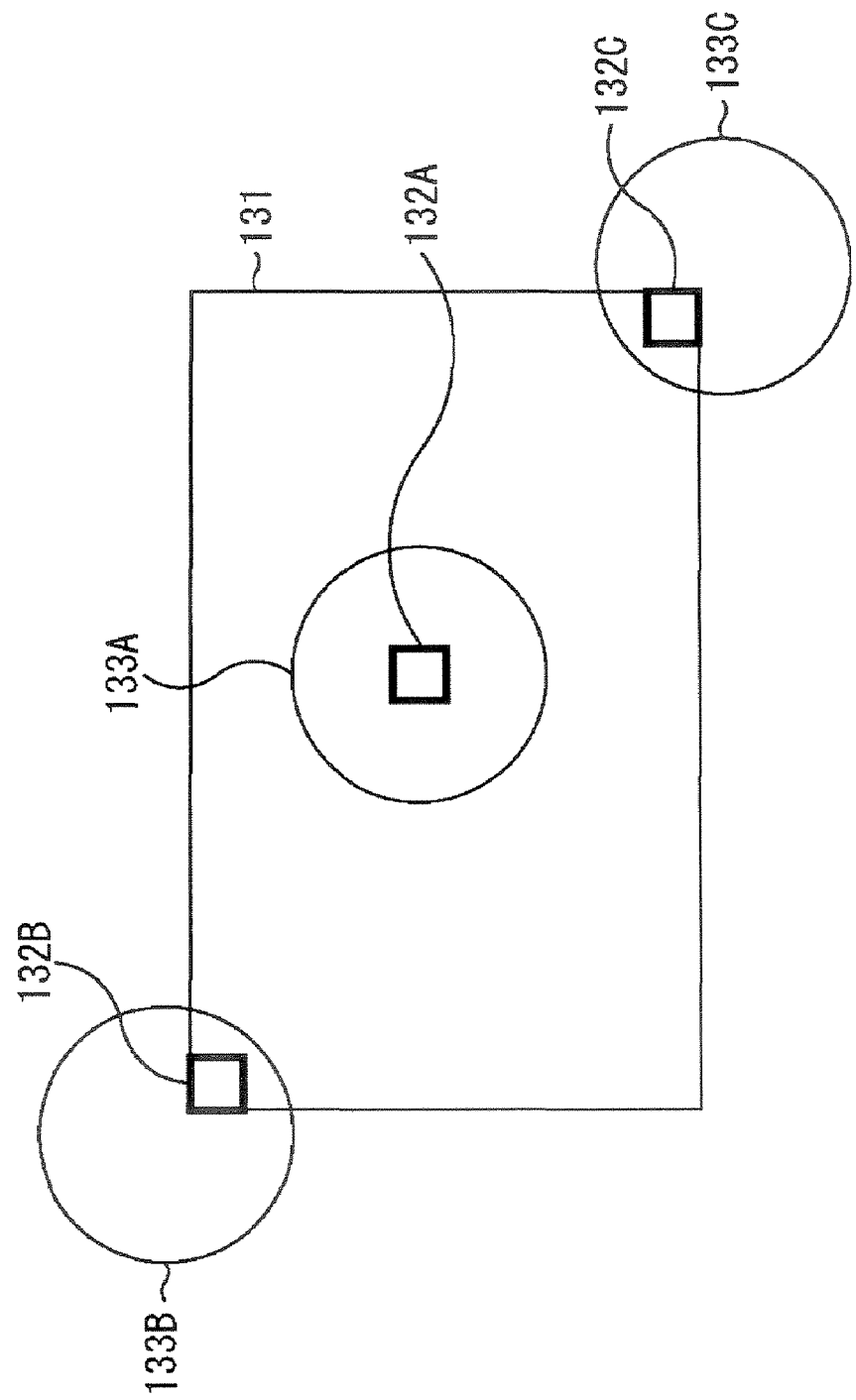
FIG. 14 is a schematic view illustrating an example of magnification chromatic aberration.

FIG. 14 is a schematic view illustrating an example of magnification chromatic aberration. Around a pixel 132A at the center of a screen 131 in FIG. 14, significant magnification chromatic aberration does not occur, but axial chromatic aberration due to a difference in focus positions on an optical axis of wavelengths mainly occurs. A distribution 133A of the chromatic aberration expands almost evenly with the pixel 132A being the center. On the other hand, significant magnification chromatic aberration occurs around pixels at the edge of the screen 131. Accordingly, distribution of chromatic aberration is uneven. For example, in FIG. 14, the center of a distribution 133B around a pixel 132B at the upper left corner of the screen 133 deviates to an upper left direction from the pixel 132B. Also, the center of a distribution 133C around a pixel 132C at the lower right corner of the screen 131 deviates to a lower right direction from the pixel 132C.

Therefore, the chromatic aberration map is corrected in accordance with the position in a screen of the target pixel. The magnification chromatic aberration information obtained by the magnification chromatic aberration correcting unit 75 in step S65 shown in FIG. 12 includes information indicating a relationship between a position in the screen and deviation of chromatic aberration. In step S66 shown in FIG. 12, the magnification chromatic aberration correcting unit 75 refers to the obtained magnification chromatic aberration information and determines whether magnification chromatic aberration needs to be corrected on the basis of the position in the screen of the target pixel.

If the target pixel is near an edge of the screen and if magnification chromatic aberration correction needs to be performed, the process proceeds to step S67, where the magnification chromatic aberration correcting unit 75 calculates a map shift amount of the chromatic aberration map on the basis of the magnification chromatic aberration information. Then, in step S68, the magnification chromatic aberration correcting unit 75 shifts the chromatic aberration map held in the chromatic aberration map holding unit 73 so as to generate a chromatic aberration map in which the magnification chromatic aberration has been corrected. The corrected chromatic aberration map is also held by the chromatic aberration map holding unit 73.

After step S68, the proceeds to step S69. If it is determined in step S66 that the target pixel is near the center of the screen and that magnification chromatic aberration correction need not be performed, steps S67 and S68 are skipped and the process proceeds to step S69.

In step S69, the map comparing unit 76 obtains the chromatic aberration map (corrected chromatic aberration map if magnification chromatic aberration has been corrected) held by the chromatic aberration map holding unit 73 and calculates the amount of chromatic aberration on the basis of the overexposure map and the chromatic aberration map.

Figure 15:
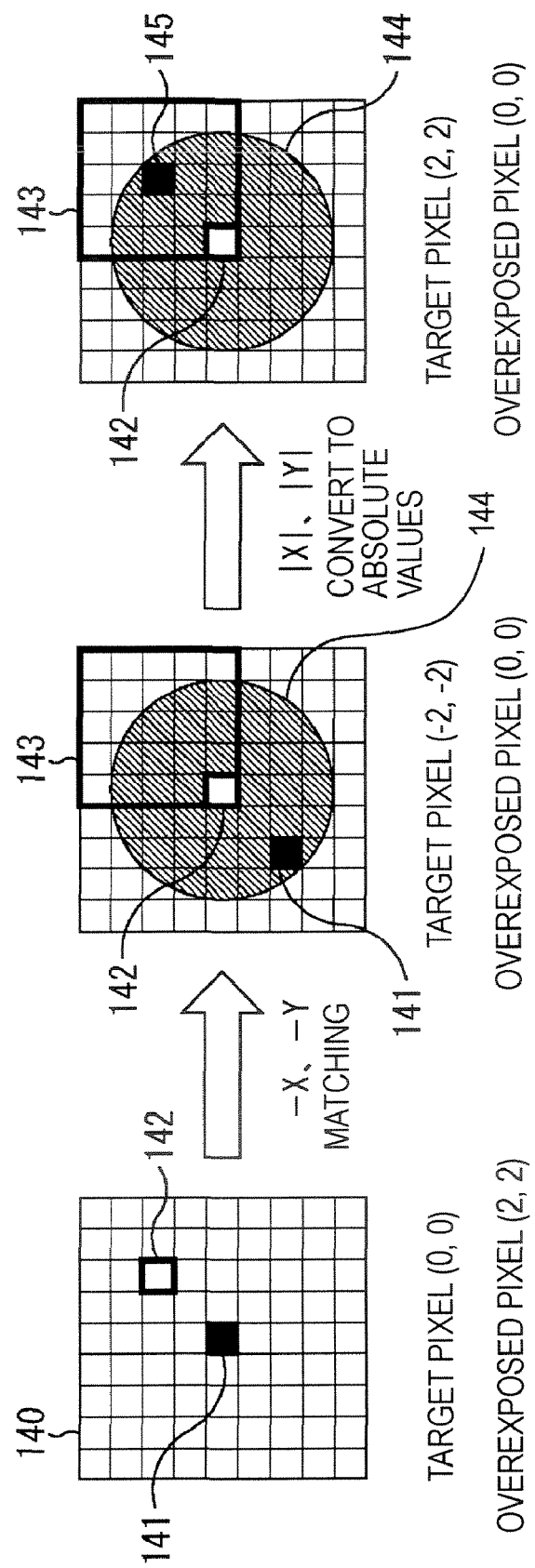
FIG. 15 illustrates an example of a matching method when magnification chromatic aberration does not exist.

FIG. 15 illustrates an example of a matching method in a case where magnification chromatic aberration does not exist.

As shown in the left part of FIG. 15, assume that the coordinates of a target pixel 141 are (0, 0) in an overexposure map 140 and that an overexposed pixel 142 exists at nearby coordinates (2, 2). The map comparing unit 76 shifts respective pixels of the overexposure map 140 so as to achieve matching between this overexposed pixel and the target pixel (coordinates of (0, 0)) of the chromatic aberration map (add "−2" to x and y coordinates). As shown in the center of FIG. 15, a chromatic aberration map 143 includes information of part of a distribution 144. Due to this shift, the overexposed pixel 142 is positioned at the center of the distribution 144 (the target pixel in the chromatic aberration map 143).

Due to this matching, the coordinates of the target pixel 141 in the overexposure map 140 are shifted to (−2, −2), and the target pixel 141 is not positioned on the chromatic aberration map 143. In that case, the map comparing unit 76 performs coordinate transformation as shown in the right part of FIG. 15. By converting the x and y coordinates to absolute values, the target pixel 141 is moved to the position of a target pixel 145 in coordinates of (2, 2) so as to be positioned on the chromatic aberration map 143.

That is, the amount of chromatic aberration at the position (2, 2) of the target pixel 145 is the amount of chromatic aberration of the target pixel 141 caused by the overexposed pixel 142. If a plurality of overexposed pixels exist around the target pixel of the overexposure map 140, the map comparing unit 76 performs the above-described matching process on each of the overexposed pixels and an integration (total) value of the amount of chromatic aberration in the respective overexposed pixels is set as the amount of chromatic aberration of the target pixel.

As described above, the map comparing unit 76 performs matching between an overexposed pixel in the overexposure map and a target pixel in the chromatic aberration map, performs coordinate transformation as necessary, moves the target pixel onto the chromatic aberration map, performs a process of calculating the amount of chromatic aberration at the position of the target pixel in the chromatic aberration map on each of overexposed pixels of the overexposure map, and sets an integration value of the amount of chromatic aberration corresponding to all of the overexposed pixels as the amount of chromatic aberration of the target pixel.

In other words, the map comparing unit 76 performs matching between a target pixel of the overexposure map and a target pixel of the chromatic aberration map, performs coordinate transformation as necessary, moves an overexposed pixel onto the chromatic aberration map, calculates the amount of chromatic aberration of all overexposed pixels in the chromatic aberration map, and sets an integration value thereof as the amount of chromatic aberration of the target pixel.

Actually, the amount of chromatic aberration of a target pixel to be corrected depends on the amount of high-contrast subject existing around the target pixel. Thus, as described above, the chromatic aberration amount calculating unit 43 applies a chromatic aberration map to each of overexposed pixels in a correction range (in the overexposure map) and integrates information of all of the overexposed pixels so as to calculate the amount of correction. Accordingly, the amount of chromatic aberration can be calculated more accurately compared to a method of determining the amount of correction on the basis of a distance between a target pixel to be corrected and the nearest overexposed pixel. Furthermore, in matching of map information, complicated operation is not performed unlike in the method of determining the amount of correction on the basis of a distance between a target pixel to be corrected and the nearest overexposed pixel. Thus, the chromatic aberration amount calculating unit 43 can calculate the amount of chromatic aberration more easily. That is, the chromatic aberration correcting unit 29 can correct chromatic aberration more easily and more accurately.

Figure 16:
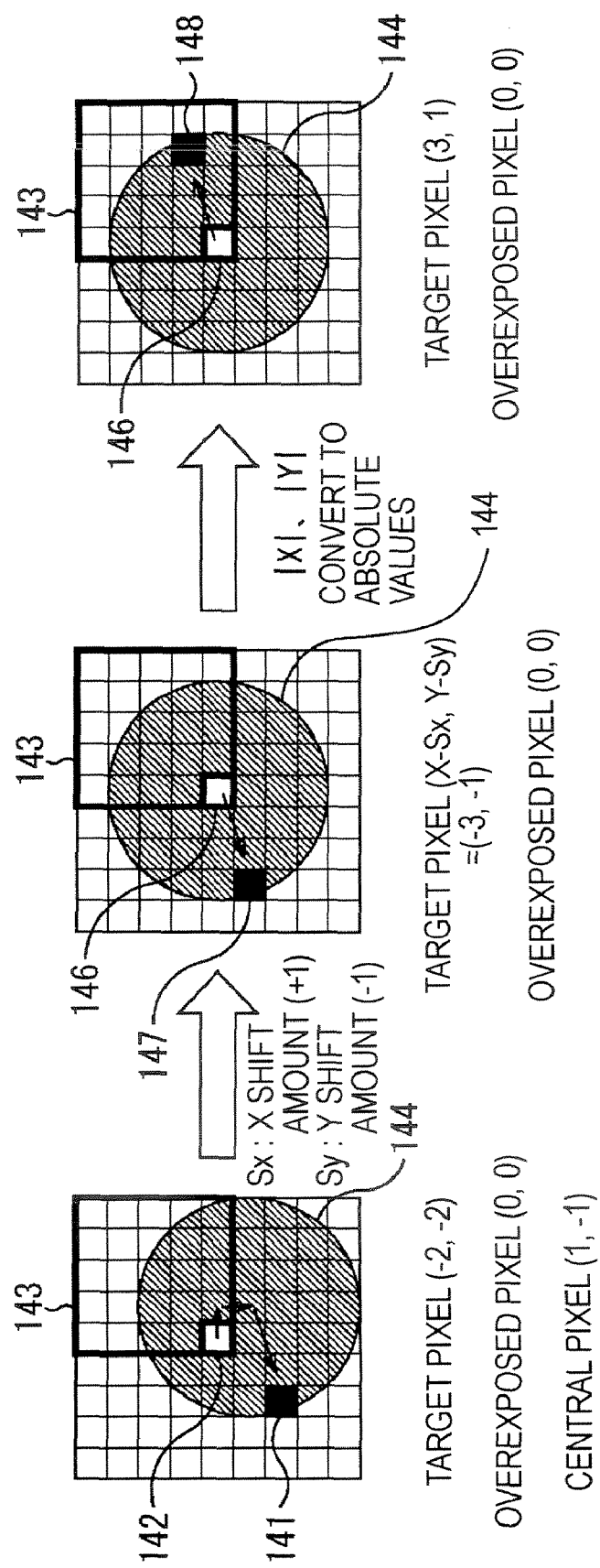
FIG. 16 illustrates an example of a matching method when magnification chromatic aberration exists.

FIG. 16 illustrates an example of a matching method in a case where magnification chromatic aberration exists.

In this case, as shown in FIG. 16, matching is performed after coordinates have been shifted in accordance with an effect of magnification chromatic aberration by correction of magnification chromatic aberration. For example, as shown in the left part of FIG. 16, a center pixel of a distribution 144 of a chromatic aberration map 143 is shifted to the coordinates (1, −1) in accordance with the magnification chromatic aberration. The map comparing unit 76 achieves matching between the overexposed pixel 142 in the chromatic aberration map 143 and the target pixel in the chromatic aberration map 143 and then shifts all pixels of the overexposure map so that the overexposed pixel 142 matches with the center pixel (overexposed pixel 146) of the distribution 144 in the chromatic aberration map 143.

Due to the shift, the coordinates of the target pixel 141 shift from (−2, −2) to (−3, −1) (target pixel 147). Then, the map comparing unit 76 performs coordinate transformation so as to convert the coordinates of the target pixel 147 to absolute values, and moves the target pixel to the coordinates (3, 1) of a target pixel 148, so that the target pixel is positioned on the chromatic aberration map 143.

That is, the amount of chromatic aberration of the target pixel 148 at the coordinates (3, 1) is the amount of chromatic aberration of the target pixel 148 due to the overexposed pixel 146. The map comparing unit 76 performs this process on each of the overexposed pixels in the overexposure map 140 and sets the integration value thereof as the amount of chromatic aberration of the target pixel.

As described above, by calculating the amount of chromatic aberration by considering both axial chromatic aberration and magnification chromatic aberration, the chromatic aberration amount calculating unit 43 can calculate the amount of chromatic aberration more accurately compared to a case of calculating the amount of chromatic aberration on the basis of only axial chromatic aberration or only magnification chromatic aberration. Also, by using both overexposure map and chromatic aberration map, the chromatic aberration amount calculating unit 43 can calculate the amount of chromatic aberration without isolating axial chromatic aberration from magnification chromatic aberration, and can calculate the amount of chromatic aberration more easily and more accurately. That is, the chromatic aberration correcting unit 29 can correct chromatic aberration more easily and more accurately.

Referring back to FIG. 12, after calculating the amount of chromatic aberration, the map comparing unit 76 supplies the amount of chromatic aberration to the corrected signal generating unit 46. Accordingly, the chromatic aberration amount calculating process ends, the process returns to step S24 shown in FIG. 9, and step S25 and the subsequent steps are performed.

Figure 17:
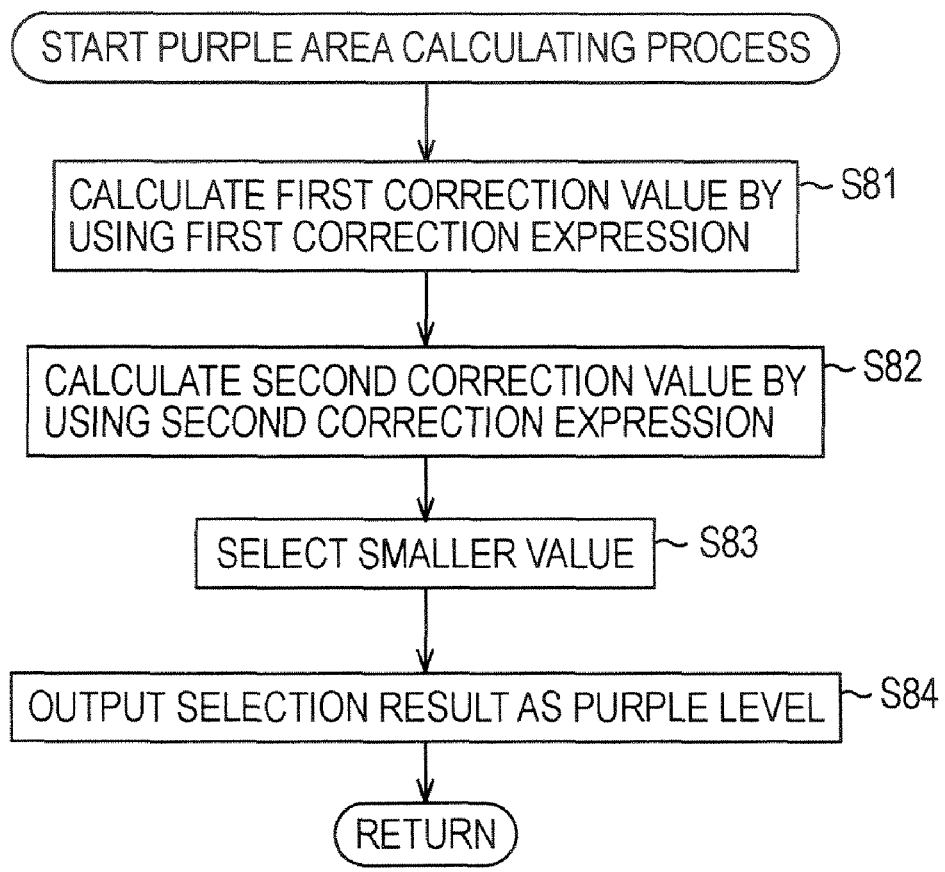
FIG. 17 is a flowchart illustrating an example of a purple area calculating process.
Figure 18:
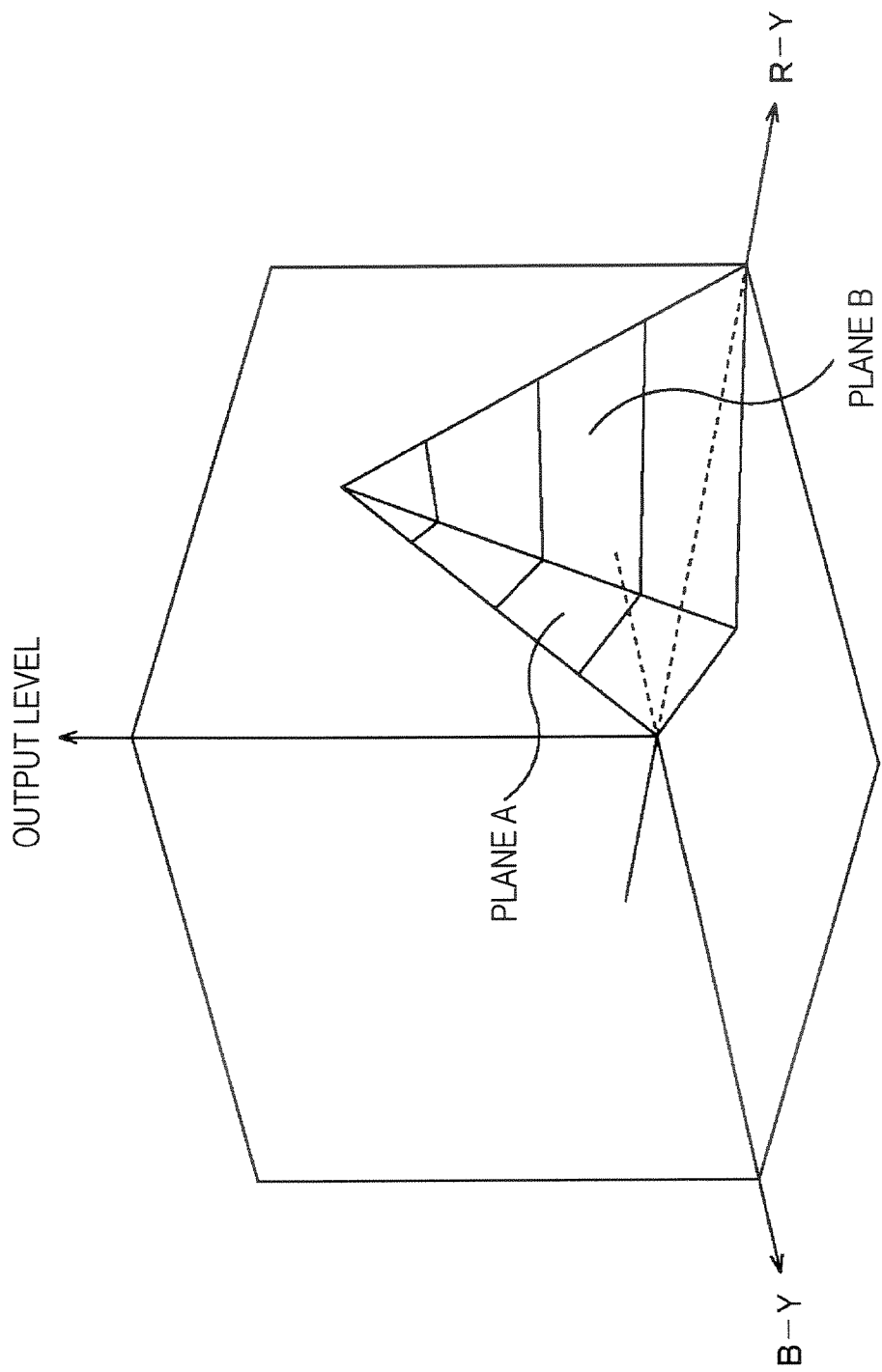
FIG. 18 shows an example of extracting a purple area.

Next, the details of the purple area calculating process performed in step S25 shown in FIG. 9 are described with reference to the flowchart shown in FIG. 17. FIG. 18 is also referred to as necessary.

After the purple area calculating process has started, the first correction value calculating unit 81 of the purple area calculating unit 45 calculates a first correction value by using a first correction expression shown in the following expression (4) in step S81.

$$\text{First correction value} = (Cr + \text{offset1}) * \text{gain\_}ry1 + (Cb + \text{offset2}) * \text{gain\_by1} \quad (4)$$

In expression (4), offset1, offset2, gain_ry1, and gain_by1 are predetermined constants, Cr is a Cr signal value, and Cb is a Cb signal value.

In step S82, the second correction value calculating unit 82 of the purple area calculating unit 45 calculates a second correction value by using a second correction expression shown in the following expression (5).

$$\text{Second correction value} = (Cr + \text{offset1}) * \text{gain\_}ry2 + (Cb + \text{offset2}) * \text{gain\_by2} \quad (5)$$

In expression (5), offset1, offset2, gain_ry2, and gain_by2 are predetermined constants, Cr is a Cr signal value, and Cb is a Cb signal value.

After the first and second correction values have been calculated, the correction value selecting unit 83 selects a smaller value from among the first and second correction values in step S83, and outputs a selection result as a purple level in step S84.

That is, as shown in FIG. 18, the purple area calculating unit 45 calculates such a correction value that a large output is obtained with respect to a color (purple) on which chromatic aberration correction is to be performed. The correction value corresponds to a smaller output level among two planes: plane A represented by the first correction expression and plane B represented by the second correction expression in space where Cb (B-Y) is an x axis, Cr (R-Y) is a y axis, and an output level is z axis (space where any of x, y, and z is within a positive range).

The parameters offset1, offset2, gain_ry1, gain_by1, gain_ry2, and gain_by2 determine the position or inclination of plane A and plane B. Each of the values is determined depending on an output level of a selected color area to be emphasized. For example, in the example shown in FIG. 18, each parameter is determined in the following manner.

offset1=offset2=0 gain_ry1=gain_by1=gain_ry2=2.0 gain_by2=−2.0

After outputting the purple level, the correction value selecting unit 83 ends the purple area calculating process. Then, the process returns to step S25 shown in FIG. 9, and step S26 and the subsequent steps are performed.

Figure 19:
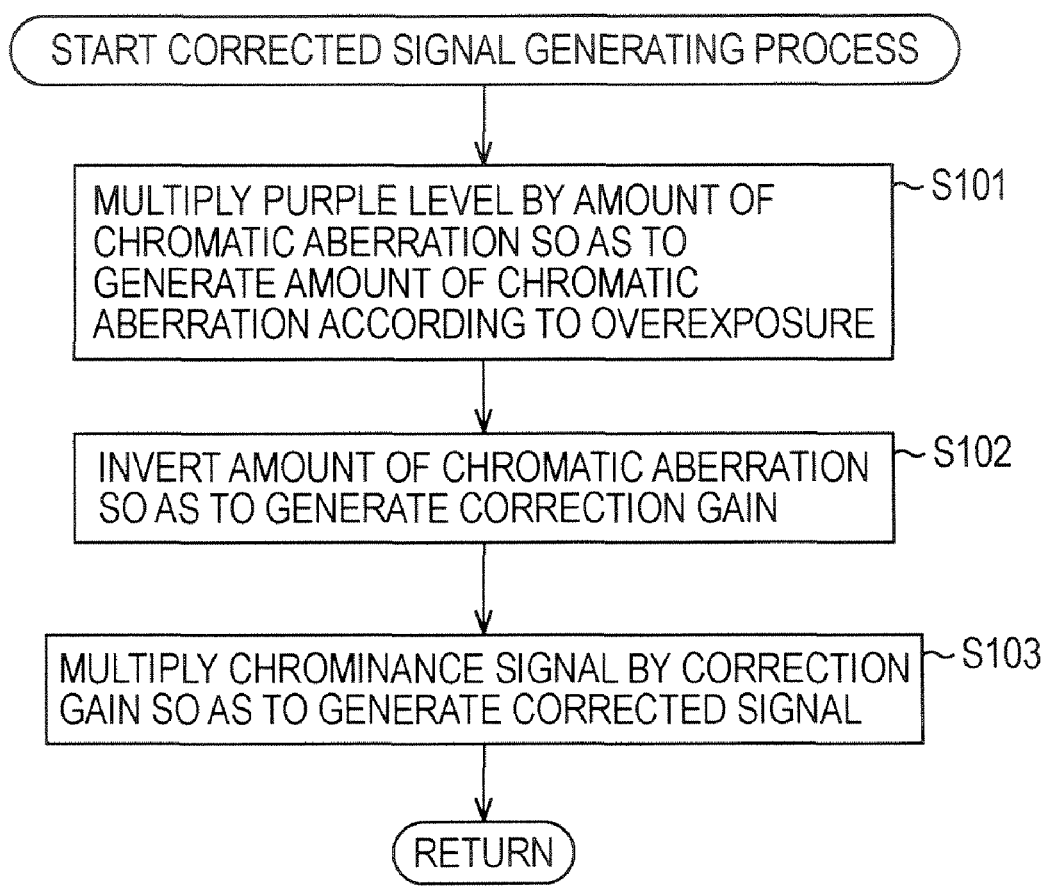
FIG. 19 is a flowchart illustrating an example of a corrected signal generating process.

Next, the details of the corrected signal generating process performed in step S26 shown in FIG. 9 are described with reference to the flowchart shown in FIG. 19.

After the corrected signal generating process has started, the multiplier 91 multiplies a purple level (P) by an amount of chromatic aberration (A) so as to generate an amount of chromatic aberration (P*A ($0 \leq P*A \leq 1$)) according to overexposure in step S101. That is, the multiplier 91 multiplies a purple level by an amount of chromatic aberration so as to increase the amount of chromatic aberration in a purple area (or decrease the amount of chromatic aberration in a non-purple area).

In step S102, the subtractor 92 subtracts the amount of chromatic aberration (P*A) according to overexposure calculated in step S101 from a value "1", so as to invert the value of the amount of chromatic aberration (P*A) according to overexposure and to generate a correction gain (1−P*A ($0 \leq 1-P*A \leq 1$)).

In step S103, the multiplier 93 multiplies chromatic signals (Cr and Cb) by the correction gain (1−P*A) so as to generate corrected signals (Cr (1−P*A) and Cb (1−P*A)). That is, the corrected signal generating unit 46 generates corrected signals by achromatizing more intensely a pixel nearer to an overexposed pixel and having a color more similar to a color to be corrected (e.g., purple), and then outputs the corrected signals.

By performing correction under consideration of a purple level, the corrected signal generating unit 46 can generate a corrected signal with more accurate chromatic aberration correction than in a method of correcting chromatic aberration of pixels near an overexposed pixel or a method of correcting chromatic aberration on the basis of only a purple level. That is, the chromatic aberration correcting unit 29 can correct chromatic aberration more accurately.

After generating the corrected signal, the multiplier 93 ends the corrected signal generating process. Then, the process returns to step S26 shown in FIG. 9, and step S27 and the subsequent steps are performed.

Figure 20:
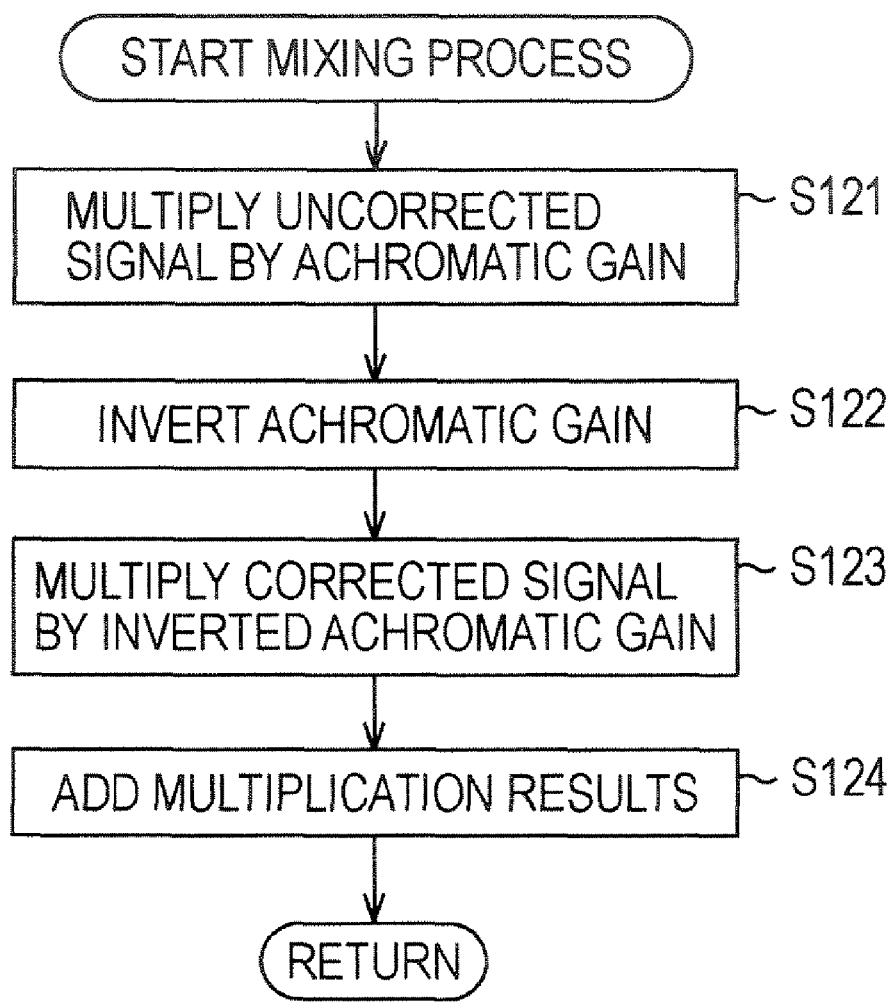
FIG. 20 is a flowchart illustrating an example of a mixing process.

Next, the details of the mixing process performed in step S29 shown in FIG. 9 are described with reference to the flowchart shown in FIG. 20.

After the mixing process has started, the multiplier 101 multiplies an uncorrected signal by achromatic gain (the amount of chromatic aberration according to overexposure) in step S121. In step S122, the subtractor 102 subtracts the achromatic gain from a value "1" so as to invert the achromatic gain.

In step S123, the multiplier 103 multiplies the corrected signal by the inverted achromatic gain. In step S124, the adder 104 adds the multiplication result generated in step S121 and the multiplication result generated in step S123 and outputs the addition result as a corrected signal (mixed signal).

That is, the mixing unit 49 calculates the following expression (6) by using the uncorrected signal, the corrected signal, and the achromatic gain, and adds the uncorrected signal and the corrected signal at a ratio according to the value of the achromatic gain (P ($0 \leq P \leq 1$)).

$$\text{Mixed signal} = (\text{uncorrected signal} \times P) + (\text{corrected signal} \times (1-P)) \tag{6}$$

As described above, the mixing unit 49 mixes the uncorrected signal and the corrected signal by using the achromatic gain so as to output corrected data about pixels on which chromatic aberration correction has been done and to output original data about pixels on which chromatic aberration correction has not been done. By mixing uncorrected image data, the mixing unit 49 can suppress degradation of image quality in an uncorrected portion and can obtain a more natural result of chromatic aberration correction. That is, the chromatic aberration correcting unit 29 can suppress unnecessary degradation of image quality and unnatural correction and can perform more appropriate correction of chromatic aberration.

After step S124, the adder 104 ends the mixing process. Then, the process returns to step S29 shown in FIG. 9, and the chromatic aberration correcting process ends.

As described above, the chromatic aberration correcting unit 29 can correct chromatic aberration more easily and more accurately. Thus, the image processing unit 14 can perform chromatic aberration correction on an input image signal more easily and more accurately. Accordingly, the image pickup apparatus 1 can obtain picked up image data on which chromatic aberration correction has been performed more easily and more accurately.

In the above-described embodiment, the overexposure determining unit 41 of the chromatic aberration correcting unit 29 determines overexposure by using a luminance signal. However, as shown in expression (1), correlation between the luminance signal (Y signal) and the green signal (G signal) of the RGB signal is strong. Thus, the overexposure determining unit 41 can perform overexposure determination by using the G signal.

Figure 21A:
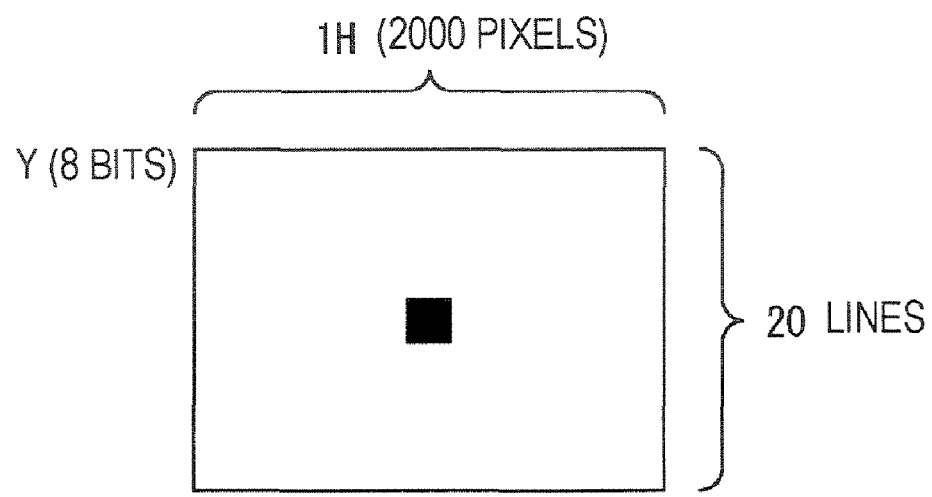
FIGS. 21A and 21B illustrate examples of capacity of a memory required in an image processing unit shown in FIG. 1.

As described above, the line memory 27 needs to hold the luminance signal when overexposure determination is performed by using the luminance signal, because delay occurs due to generation of an overexposure map. For example, if the overexposure map is generated in a range of 20 lines in the vertical direction of an image, the line memory 27 needs to hold a luminance signal of 20 lines, as shown in FIG. 21A. If each line includes 2000 pixels and if a luminance value is 8-bit data, a storage area of 320000 bits (=8 bits×20 lines× 2000 pixels) is required.

Figure 21B:
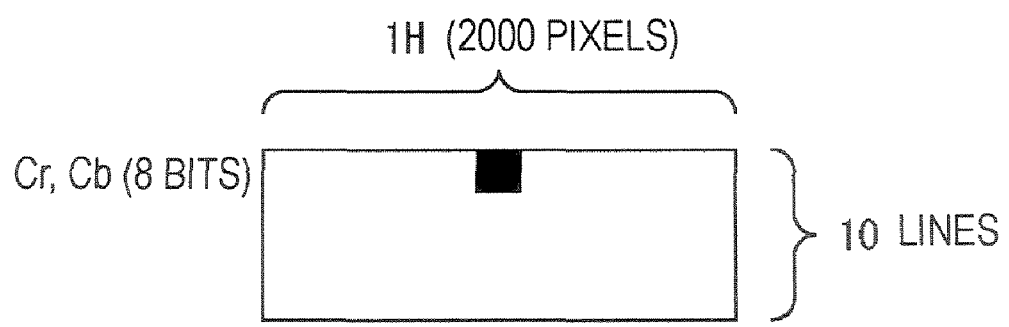

Furthermore, chrominance signals need to be held by the line memory 44 during delay. That is, in the above-described example, the line memory 44 needs to hold data of 10 lines, as shown in FIG. 21B. If each line includes 2000 pixels and if a chrominance value is 8-bit data, a storage area of 160000 bits (=8 bits×10 lines×2000 pixels) is required.

That is, in the image processing unit 14 shown in FIG. 1, a storage area of 320000+160000=480000 bits is required in order to correct chromatic aberration.

In the image pickup apparatus 1 shown in FIG. 1, overexposure determination is performed by using a luminance signal. Thus, the overexposure determining unit 41 of the chromatic aberration correcting unit 29 in the image processing unit 14 can perform overexposure determination only after the optical element/image pickup element correction processing unit 21 to the γ correcting unit 25 have performed processes on an image signal and the Y signal processing unit 26 has generated a luminance signal.

Incidentally, in the noise reduction process performed by the noise reduction processing unit 22 or in the demosaic process performed by the demosaic processing unit 23 among the processes performed by the optical element/image pickup element correction processing unit 21 to the γ correcting unit 25, a spatial process is performed over a plurality of lines in the vertical direction of an image. Thus, the noise reduction processing unit 22 and the demosaic processing unit 23 include a line memory so as to hold image signals of a plurality of lines for a predetermined period. Thus, the output thereof is delayed accordingly.

Figure 22:
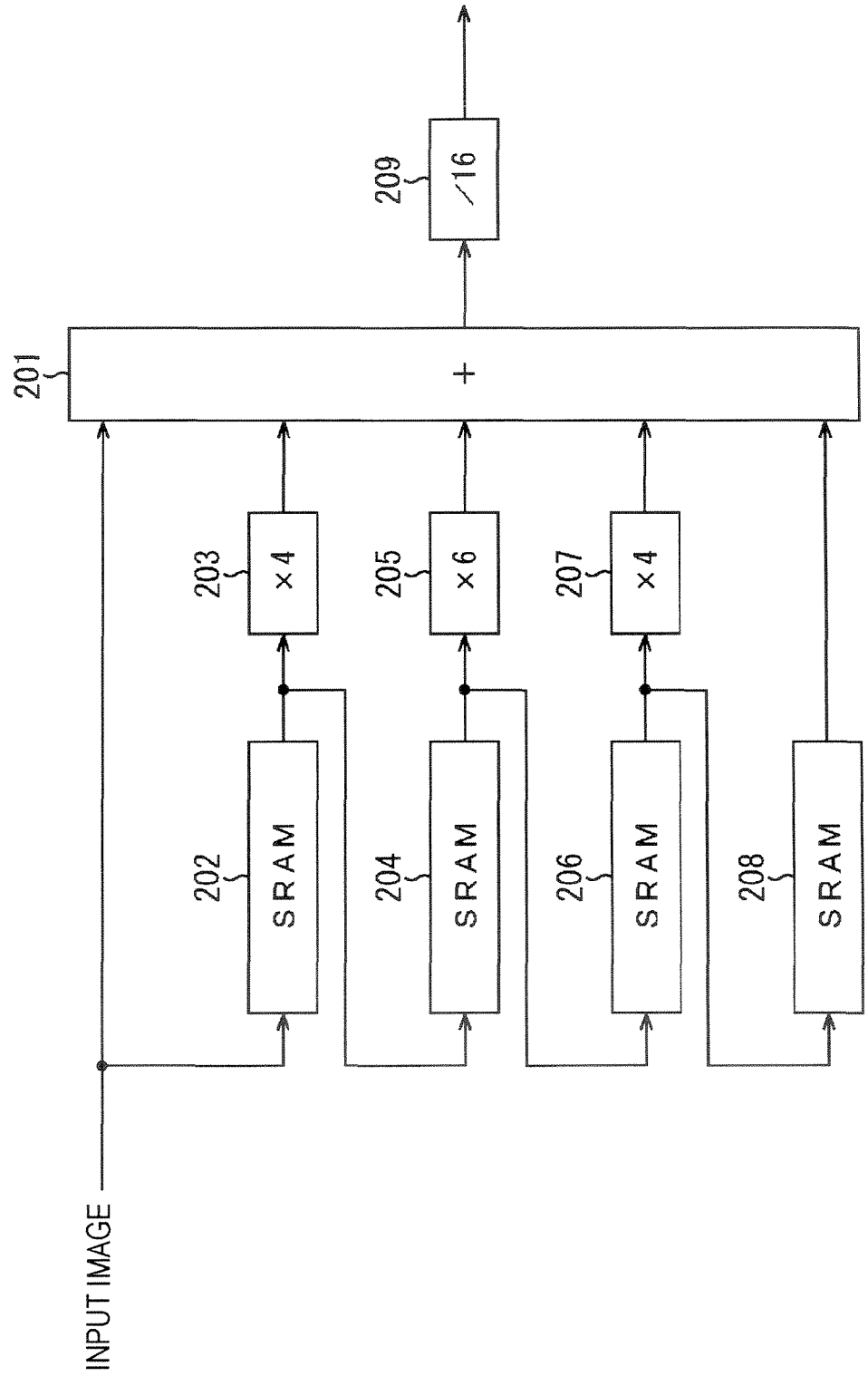
FIG. 22 is a block diagram showing an example of a configuration of a low-pass filter.

An example of the spatial process is described below. FIG. 22 is a block diagram showing an example of a configuration of a 5-tap low-pass filter in the vertical direction of the image.

The low-pass filter shown in FIG. 22 includes an adder 201, an SRAM 202, a multiplier 203, an SRAM 204, a multiplier 205, an SRAM 206, a multiplier 207, an SRAM 208, and a divider 209.

Each of the SRAMs 202, 204, 206, and 208 serves as a line memory to hold image signals of one line. These SRAMs are connected in series. When an image signal of a line is newly supplied to the SRAM 202, image signals held by the respective SRAMs are sequentially transferred. The output of the SRAM 202 is multiplied by 4 by the multiplier 203 and is supplied to the adder 201. Likewise, the output of the SRAM 204 is multiplied by 6 by the multiplier 205 and is supplied to the adder 201. Also, the output of the SRAM 206 is multiplied by 4 by the multiplier 207 and is supplied to the adder 201. The input of the SRAM 202 and the output of the SRAM 208 are directly supplied to the adder 201.

The adder 201 adds all of the input values and supplies an addition result to the divider 209. The divider 209 outputs 1/16 of the addition result.

That is, this low-pass filter is a vertical low-pass filter of (1, 4, 6, 4, 1), and includes four stages of line memories (SRAMs) connected in the vertical direction, each SRAM holding an image signal of a line. In FIG. 22, the lower SRAM holds older data (of the upper side of the screen), whereas the upper SRAM holds newer data (of the lower side of the screen). At this time, an output phase of the image data is held at a center of the low-pass filter, that is, by the SRAM 204, and is delayed by two lines with respect to a current signal that is output after being multiplied by 6 by the multiplier 205.

In this way, the above-described configuration including the SRAMs is necessary in order to perform image processing by using a plurality of pixels in a vertical direction. Accordingly, delay of several lines occurs.

As described above, by performing overexposure determination by using a green signal (G signal), delay due to the line memories (SKAMs) may be used and the size of memory required for chromatic aberration correction may be reduced.

Figure 23:
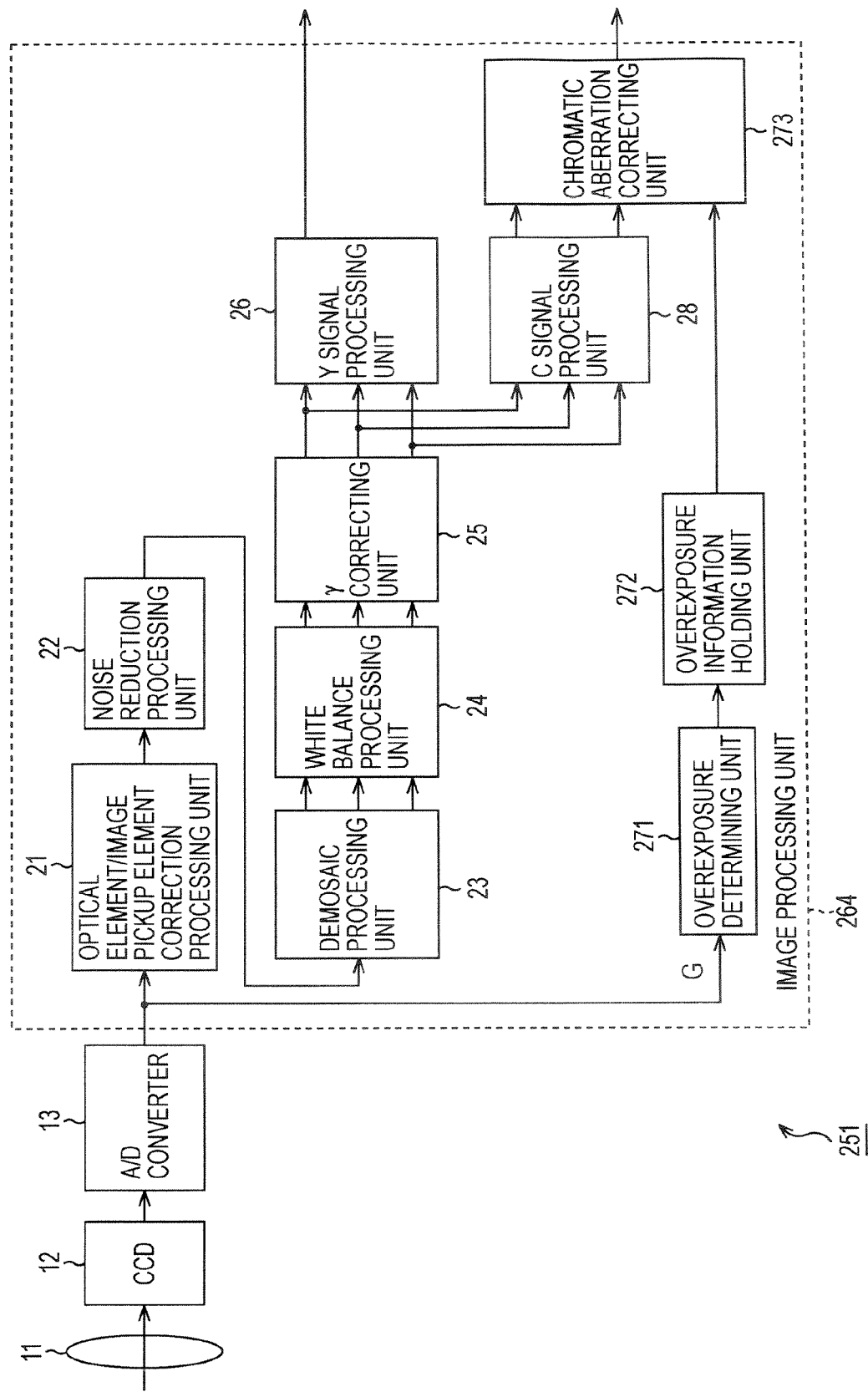
FIG. 23 is a block diagram showing an example of a configuration of an image pickup apparatus according to another embodiment of the present invention.

FIG. 23 is a block diagram showing an example of a configuration of an image pickup apparatus according to another embodiment of the present invention.

In FIG. 23, an image pickup apparatus 251 includes an image processing unit 264 instead of the image processing unit 14 of the image pickup apparatus 1 shown in FIG. 1.

The image processing unit 264 includes the optical element/image pickup element correction processing unit 21, the noise reduction processing unit 22, the demosaic processing unit 23, the white balance processing unit 24, the γ correcting unit 25, the Y signal processing unit 26, and the C signal processing unit 28, as in the image processing unit 14. Also, the image processing unit 264 includes an overexposure determining unit 271, an overexposure information holding unit 272, and a chromatic aberration correcting unit 273.

The overexposure determining unit 271 basically has the same configuration as that of the overexposure determining unit 41 shown in FIG. 3 and performs the same process. Note that, the overexposure determining unit 41 performs overexposure determination by using a luminance signal, whereas the overexposure determining unit 271 performs overexposure determination by using a green signal (G signal) output from the A/D converter 13. However, the determining method is the same in the both determining units 41 and 271. The overexposure determining unit 271 supplies an overexposure determination result (e.g., information of 1 bit) obtained on the basis of the green signal to the overexposure information holding unit 272.

As the overexposure information holding unit 42 shown in FIG. 2, the overexposure information holding unit 272 temporarily holds the determination result supplied from the overexposure determining unit 271 as overexposure information. Then, the overexposure information holding unit 272 generates an overexposure map of a target pixel in the chromatic aberration correcting unit 273 by using the overexposure information held therein and supplies the overexposure map to the chromatic aberration correcting unit 273 at predetermined timing.

The chromatic aberration correcting unit 273 performs chromatic aberration correction on chrominance signals by using the overexposure map.

Figure 24:
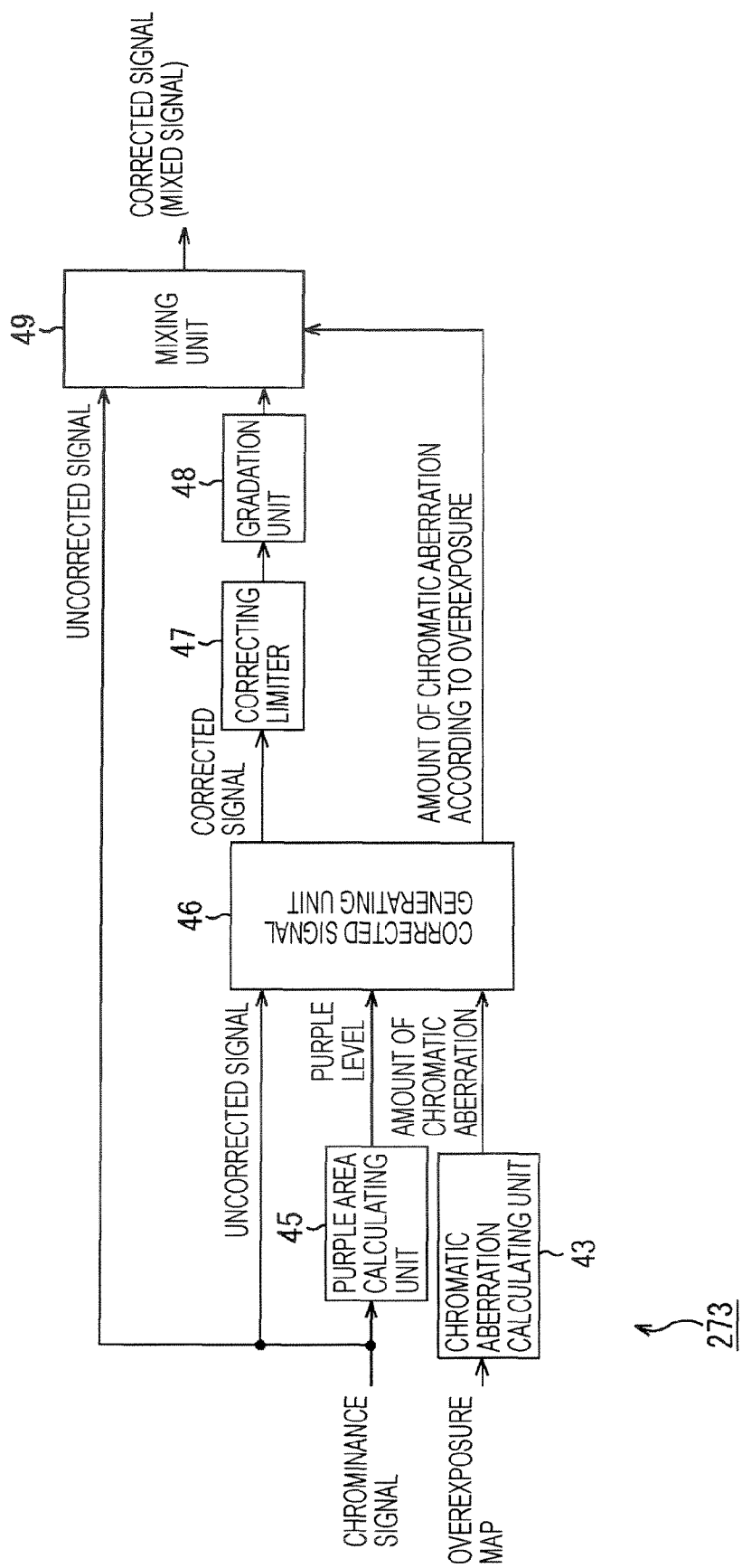
FIG. 24 is a block diagram showing an example of a configuration of a chromatic aberration correcting unit shown in FIG. 23.

FIG. 24 is a block diagram showing an example of a specific configuration of the chromatic aberration correcting unit 273 shown in FIG. 23. In FIG. 24, the chromatic aberration correcting unit 273 includes the chromatic aberration amount calculating unit 43, the purple area calculating unit 45, the corrected signal generating unit 46, the correcting limiter 47, the gradation unit 48, and the mixing unit 49.

That is, the configuration of the chromatic aberration correcting unit 273 is equivalent to the configuration of the chromatic aberration correcting unit 29 shown in FIG. 2 except the overexposure determining unit 41, the overexposure information holding unit 42, and the line memory 44. Thus, the description about each unit is not repeated.

Hereinafter, an example of image processing performed by the image processing unit 264 shown in FIG. 23 is described with reference to the flowchart shown in FIG. 25. The flowchart of the image processing shown in FIG. 25 corresponds to the flowchart of the image processing shown in FIG. 8 performed by the image processing unit 14 shown in FIG. 1.

After the image processing has started, the overexposure determining unit 271 of the image processing unit 264 performs overexposure determination by using a green signal (G signal) supplied from the A/D converter 13. The overexposure determination is performed in the same manner as in the process described above with reference to the flowchart shown in FIG. 11, and thus the corresponding description is omitted. Note that, in the process shown in FIG. 25, a green signal (G signal) is used instead of a luminance signal.

After the overexposure determining process of step S201 has ended, the overexposure information holding unit 272 holds the determination result in step S202.

Steps S203 to S209 are performed in the same manner as steps S1 to S8 shown in FIG. 8.

In step S210, the overexposure information holding unit 272 generates an overexposure map of a target pixel in the chromatic aberration correcting unit 273 on the basis of the held determination result and supplies the overexposure map to the chromatic aberration correcting unit 273. The chromatic aberration correcting unit 273 performs a chromatic aberration correcting process in step S211 and outputs a luminance signal and a chrominance signal in step S212, so that the image processing ends.

Figure 25:
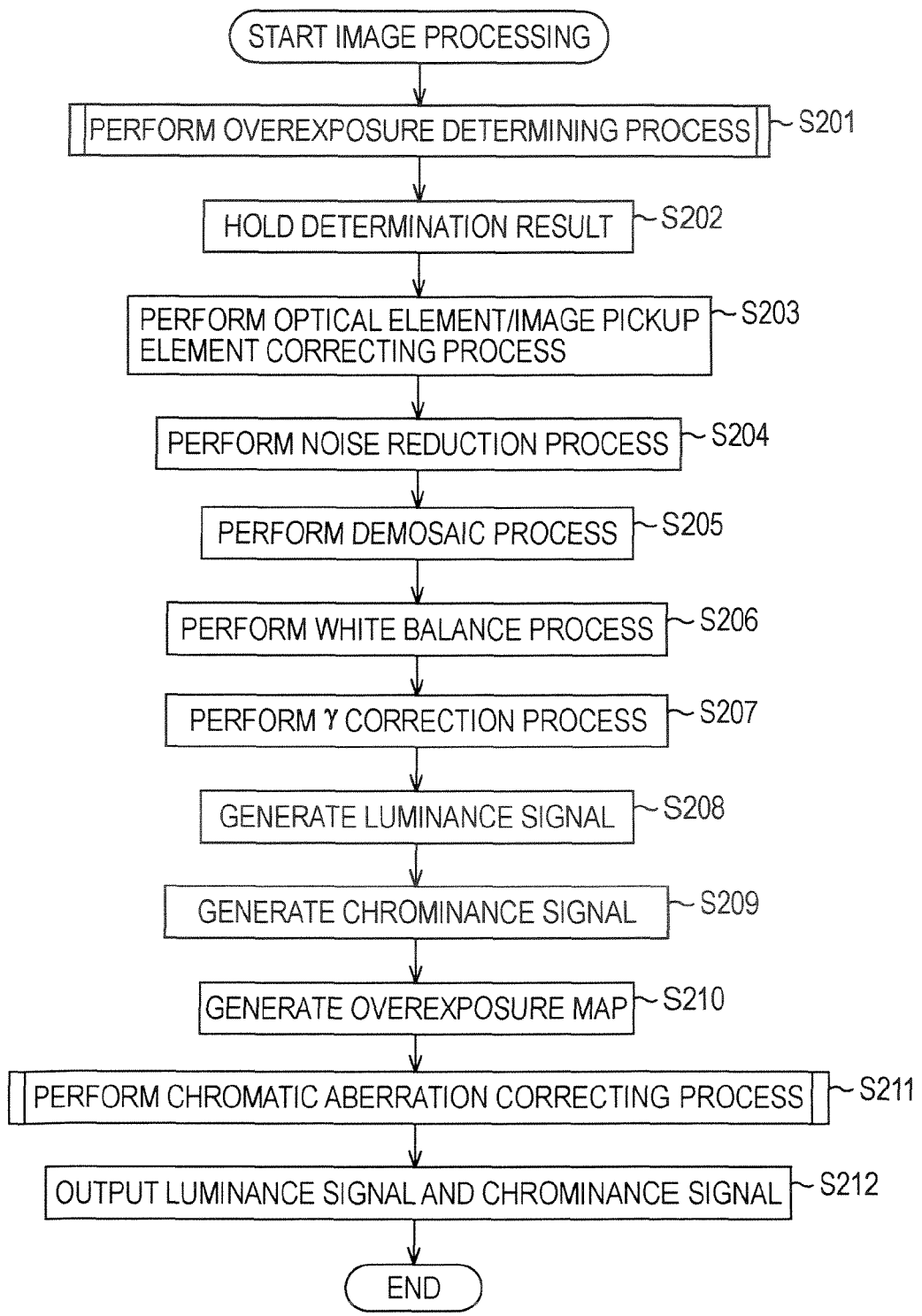
FIG. 25 is a flowchart illustrating an example of image processing.
Figure 26:
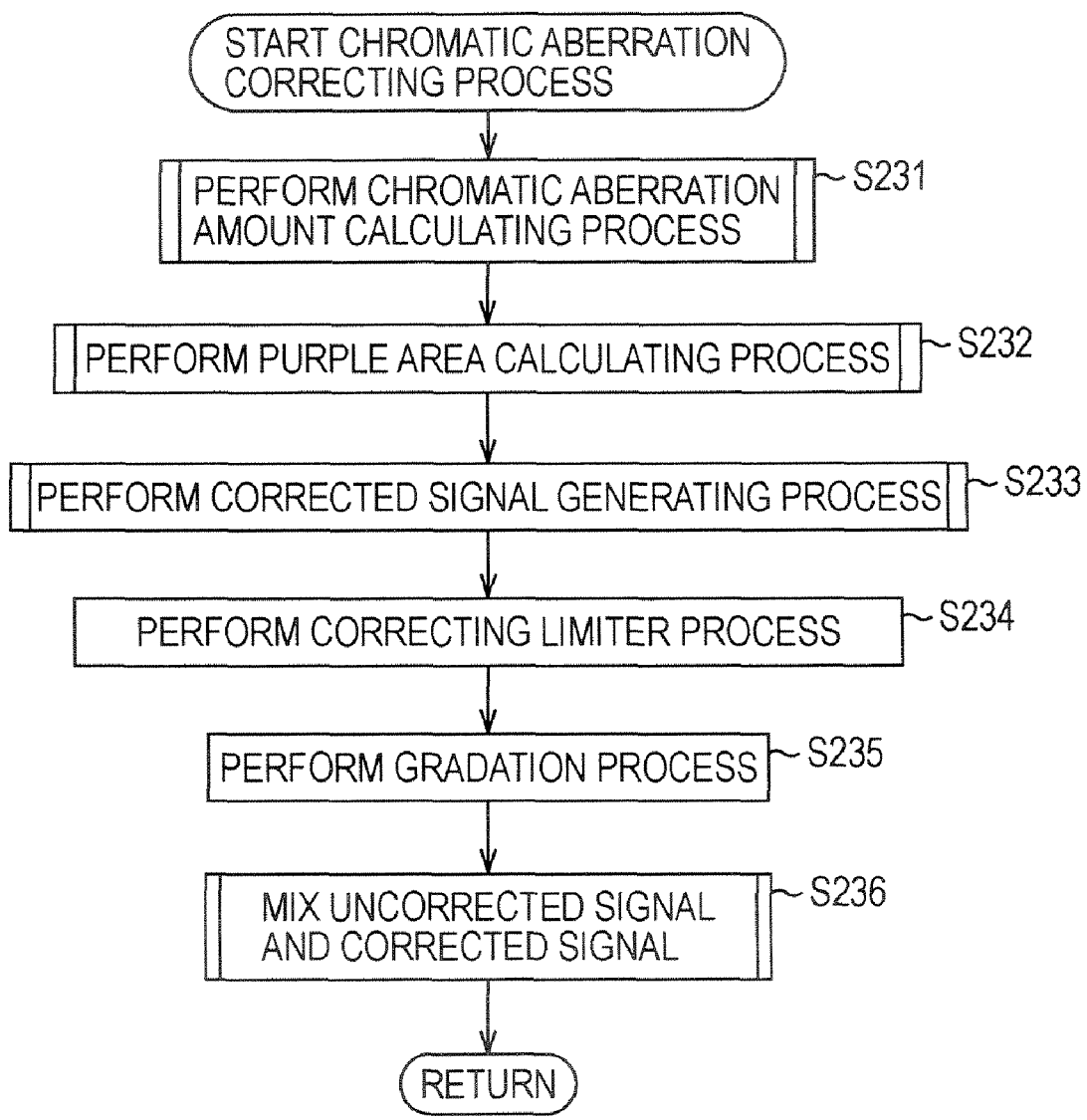
FIG. 26 is a flowchart illustrating an example of a chromatic aberration correcting process.

Next, the details of the chromatic aberration correcting process performed in step S211 shown in FIG. 25 are described with reference to the flowchart shown in FIG. 26. The flowchart of the chromatic aberration correcting process shown in FIG. 26 corresponds to the flowchart of the chromatic aberration correcting process shown in FIG. 9 performed by the chromatic aberration correcting unit 29 shown in FIG. 2.

After the chromatic aberration correcting process has started, respective units of the chromatic aberration correcting unit 273 perform steps S231 to S236 as in steps S24 to S29 shown in FIG. 9 so as to output a mixed signal. That is, the chromatic aberration correcting unit 273 performs the chromatic aberration correcting process as in the chromatic aberration correcting unit 29 shown in FIG. 2, except that the overexposure map is generated in advance. After outputting the mixed signal, the mixing unit 49 ends the chromatic aberration correcting process. Then, the process returns to step S211 shown in FIG. 25, and step S212 is performed.

As described above, the overexposure determining process is performed in advance by using output from the A/D converter 13, and the overexposure information holding unit 273 holds the overexposure information as information of one bit. With this configuration, the overexposure information can be accumulated by using time difference (delay) until image data reaches the chromatic aberration correcting unit 273 from the A/D converter 13. That is, time to accumulate overexposure information for generating an overexposure map can be saved by using the line memory included in each unit of the image processing unit, so that the capacity of a memory required for chromatic aberration correction can be significantly reduced. The time difference depends on the size of circuit to perform a spatial process in the vertical direction, such as a noise reduction process and a demosaic process, that is, on the number of line memories.

Figure 27:
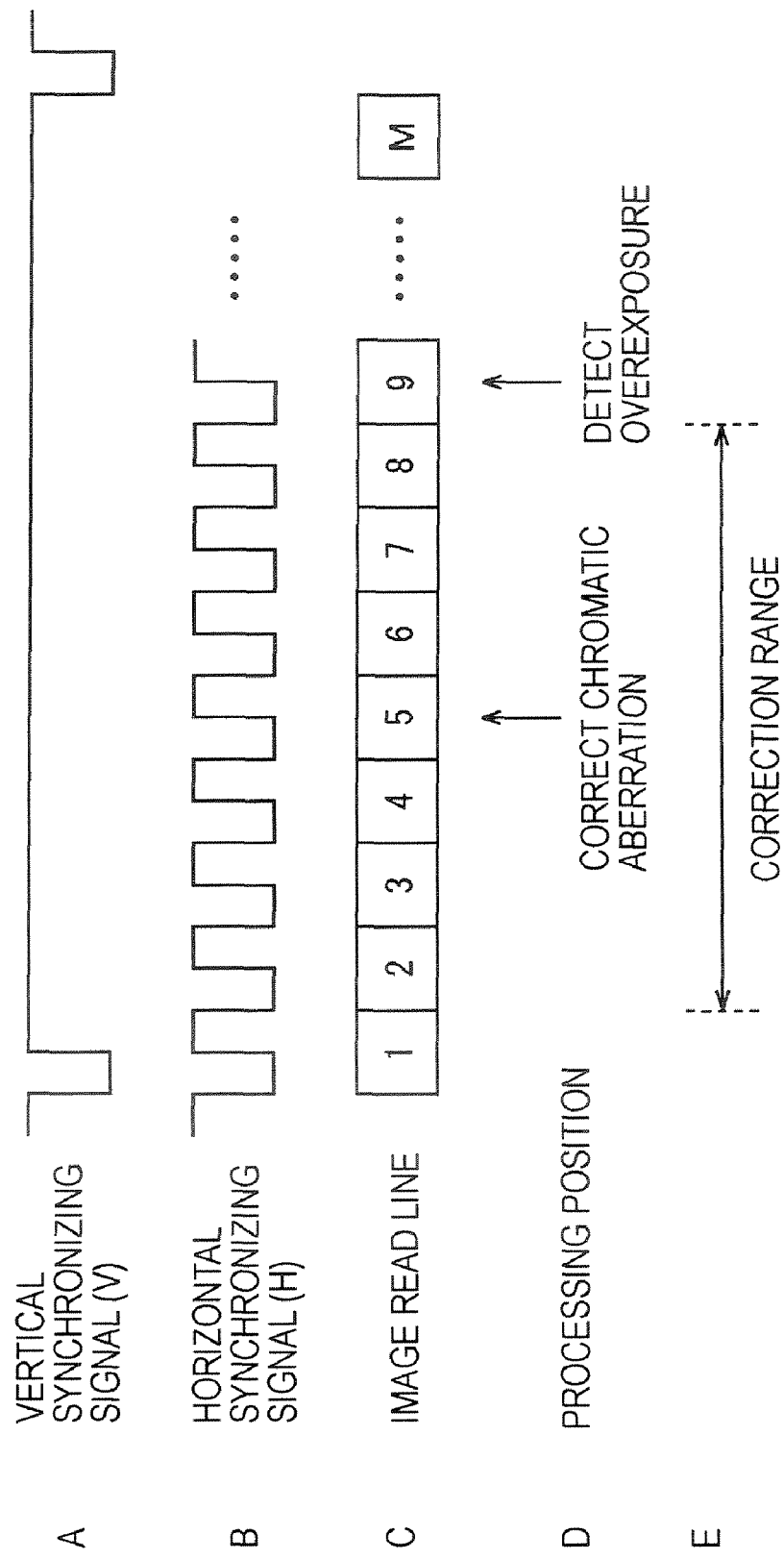
FIG. 27 illustrates a relationship between an overexposure detecting process and a chromatic aberration correcting process in time series.
Figure 28:
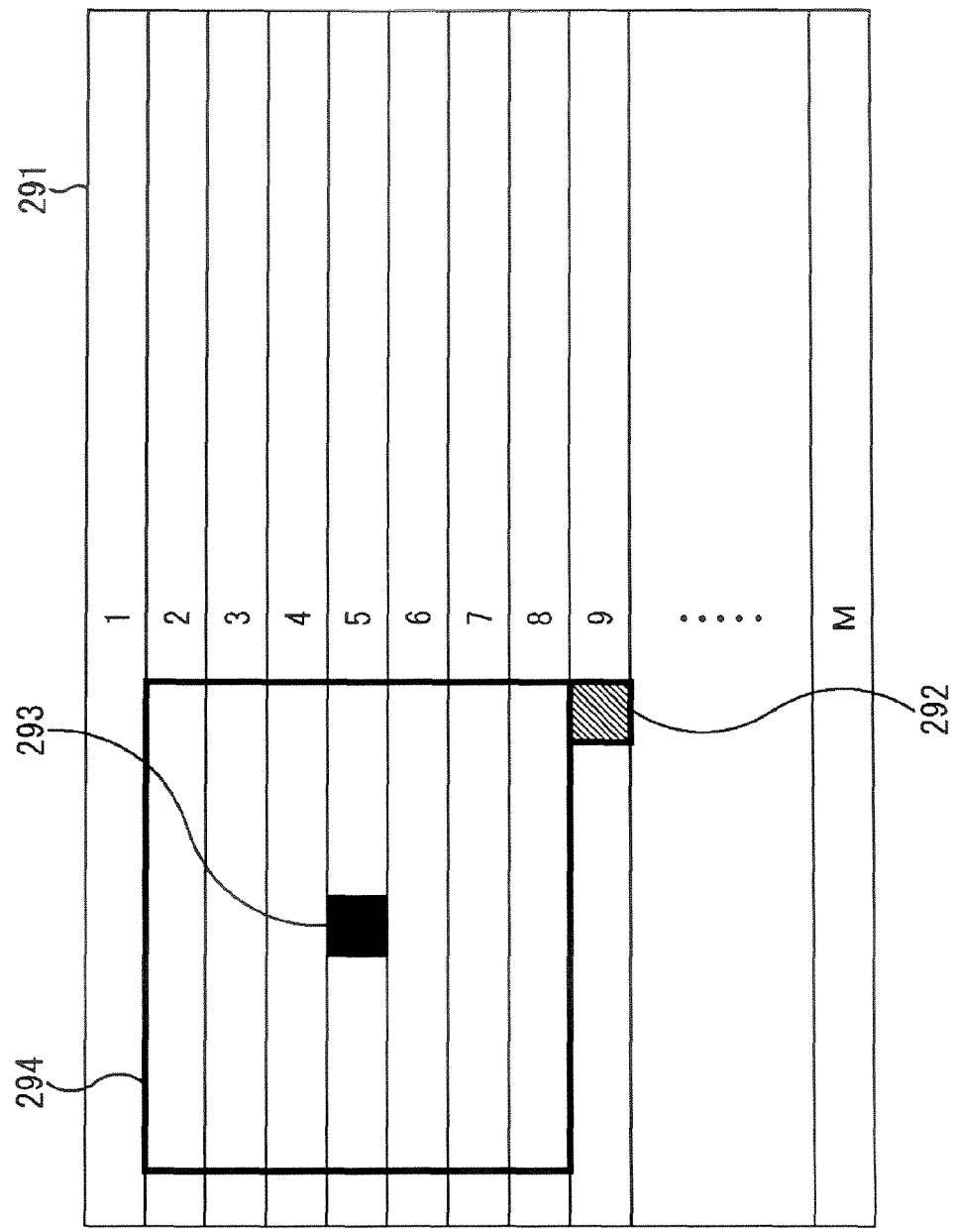
FIG. 28 illustrates a relationship between an overexposure detecting process and a chromatic aberration correcting process in a screen.

FIG. 27 illustrates a relationship between an overexposure detecting process and a chromatic aberration correcting process in time series performed in the image processing unit 264 shown in FIG. 23. FIG. 28 illustrates a relationship between an overexposure detecting process and a chromatic aberration correcting process in a screen performed by the image processing unit 264 shown in FIG. 23.

For example, assume that an image signal supplied from the A/D converter 13 includes a vertical synchronizing signal (V) shown in A in FIG. 27 and a horizontal synchronizing signal (H) shown in B in FIG. 27, and is read one line by one from the CCD 12 as in an image read line shown in C in FIG. 27. When a ninth line of such an image signal is input to the image processing unit 264, detection of an overexposed pixel is performed on the ninth line by the overexposure determining unit 271 as shown in D in FIG. 27, and chromatic aberration correction is performed on a fifth line by the chromatic aberration correcting unit 273. At this time, a correction range (range of the overexposure map) is from a second line to an eighth line, as shown in E in FIG. 27.

As shown in FIG. 28, when overexposure determination is performed on a target pixel 292 for overexposure detection in the ninth line of a screen 291, a determination result in a correction range 294 from the second line to the eighth line indicated by a bold line is output to the chromatic aberration correcting unit 273 as an overexposure map for a target pixel 293 for chromatic aberration correction in the fifth line. The chromatic aberration correcting unit 273 performs chromatic aberration correction on the target pixel 293 in the fifth line by using this overexposure map.

In this case, delay of four lines occurs due to generation of the overexposure map. However, delay of another process is used as described above, and thus delay due to generation of the overexposure map does not occur actually.

Figure 29:
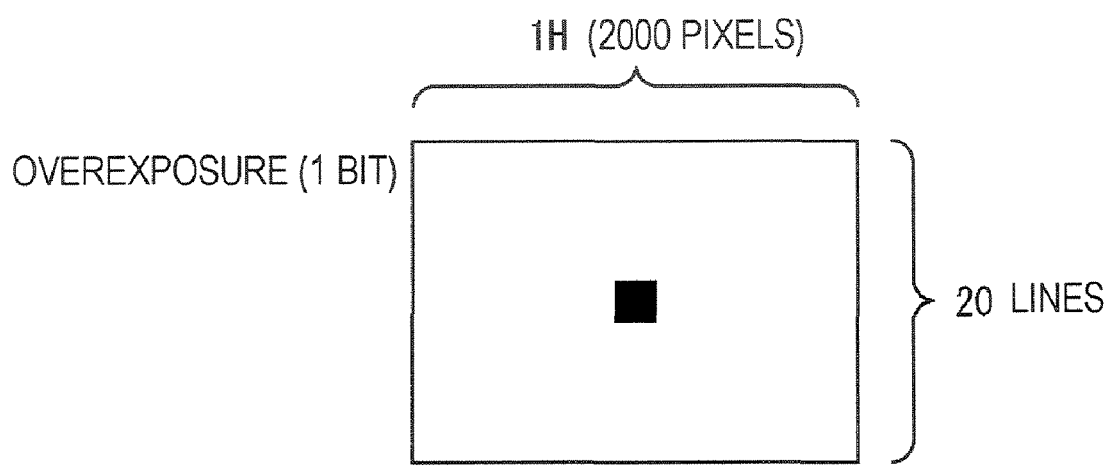
FIG. 29 illustrates an example of capacity of a memory required in an image processing unit shown in FIG. 23.

That is, in the image processing unit 264 shown in FIG. 23, no delay occurs in the chromatic aberration correcting unit 273 and thus the line memory 27 of the image processing unit 14 shown in FIG. 1 and the line memory 44 (FIG. 2) can be omitted. The storage area of the overexposure information holding unit 272 may be 40000 bits (=1 bit×20 lines×2000 pixels), as shown in FIG. 29. That is, the image processing unit 264 can omit the storage area shown in FIGS. 21A and 21B. Accordingly, the storage capacity required for a chromatic aberration correcting process can be significantly reduced, the scale of circuit can be reduced, and a manufacturing cost can be reduced. Also, power consumption and operating cost can be reduced. Furthermore, a smaller number of components leads to enhancement of durability and reliability. That is, the image processing unit 264 can perform chromatic aberration correction more easily and more accurately.

The image pickup apparatus has been described above. Any apparatus can be used as long as it performs image processing.

In the above-described embodiments, an overexposure map and a chromatic aberration map are generated and are compared with each other. The size of range and form of those maps are not limited to those described above. The size of range and form of the overexposure map may be different from those of the chromatic aberration map. Furthermore, those maps need not always be map information including data of respective pixels as long as they substantially have information equivalent to the above-described overexposure map and the chromatic aberration map and chromatic aberration correction can be performed by comparing those maps. For example, table information including only necessary information or functions of coordinates and values may be used. That is, for example, the image processing unit 14 or the image processing unit 264 may perform an achromatizing operation by using a result generated by multiplying a function depending on overexposure (overexposure distribution information indicating distribution of overexposed pixels) by output of chromatic function (chromatic aberration amount distribution information indicating distribution of the amount of chromatic aberration, which is the amount of correction about chromatic aberration of pixels around a target pixel).

The above-described series of processes can be performed by hardware or software. In this case, each of the above-described devices may be configured by a personal computer 300 shown in FIG. 30.

Figure 30:
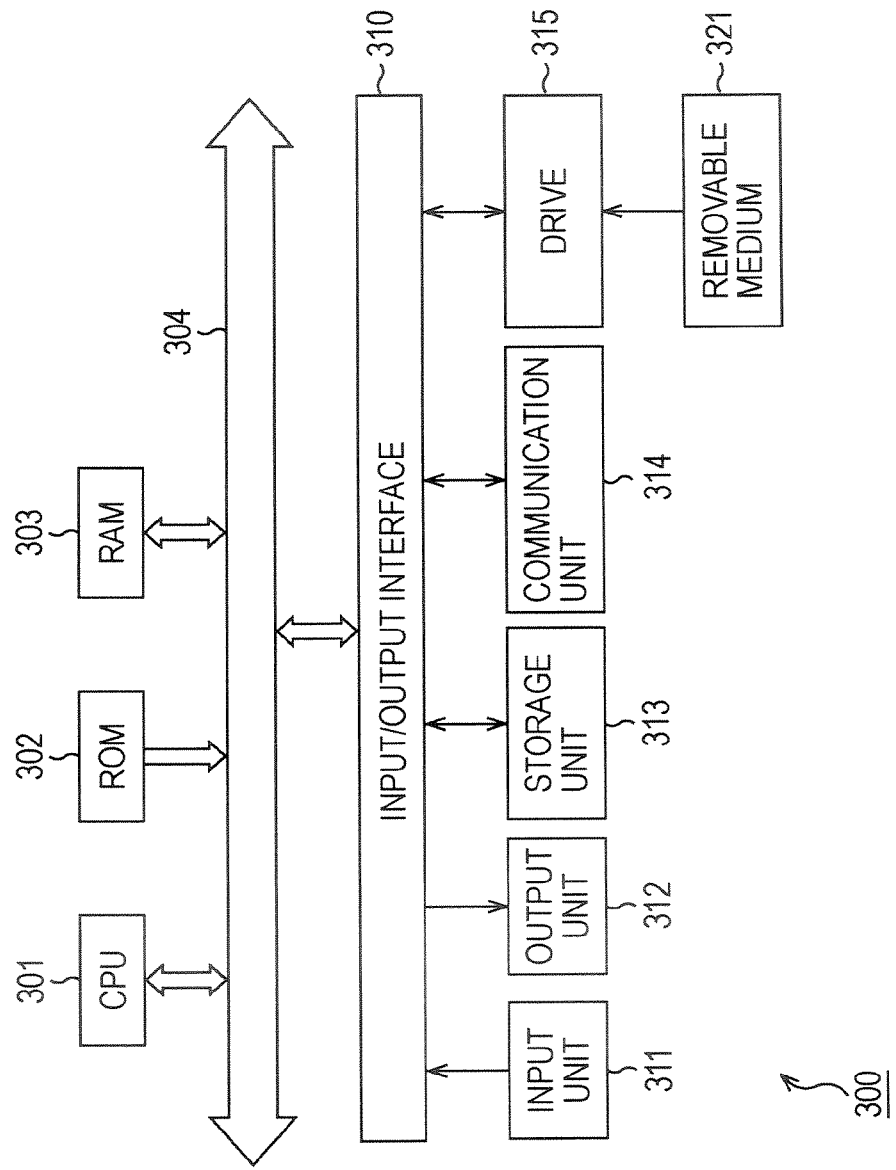
FIG. 30 illustrates an example of a configuration of a personal computer according to an embodiment of the present invention.

In FIG. 30, a CPU (central processing unit) 301 of the personal computer 300 executes various processes in accordance with a program stored in a ROM (read only memory) 302 or a program loaded from a storage unit 313 to a RAM (random access memory) 303. The RAM 303 also stores data required by the CPU 301 to execute various processes.

The CPU 301, the ROM 302, and the RAM 303 connect to each other via a bus 304. An input/output interface 310 also connects to the bus 304.

The input/output interface 310 connects to an input unit 311 including a keyboard and a mouse, an output unit 312 including a display such as a CRT (cathode ray tube) or an LCD (liquid crystal display) and a speaker, the storage unit 313 including a hard disk or the like, and a communication unit 314 including a modem. The communication unit 314 performs communication via a network including the Internet.

A drive 315 connects to the input/output interface 310 as necessary, a removable medium 321 such as a magnetic disk, an optical disc, a magneto-optical disc, or a semiconductor memory is loaded thereto, and a computer program read therefrom is installed into the storage unit 313 as necessary.

When the above-described series of processes are performed by software, a program constituting the software is installed via a network or a recording medium.

The recording medium may be the removable medium 321 shown in FIG. 30 supplied to distribute a program to a user and separated from the apparatus, such as a magnetic disk (including a flexible disk), an optical disc (including a CD-ROM (compact disc read only memory) and a DVD (digital versatile disc)), a magneto-optical disc (including an MD (Mini-Disk®)), or a semiconductor memory. Alternatively, the recording medium may be the ROM 302 or a hard disk included in the storage unit 313 distributed to a user while being incorporated in the apparatus and storing a program.

In this specification, the steps describing a program recorded on a recording medium may be performed in time series in accordance with the described order. Alternatively, the steps may be performed in parallel or individually.

In this specification, a system means an entire apparatus including a plurality of devices.

Incidentally, a single apparatus described above may be divided into a plurality of devices. Conversely, a plurality of devices may be integrated into an apparatus. Of course, another configuration may be added to the configuration of each device. Furthermore, part of the configuration of a device may be included in the configuration of another device if the configuration and operation of an entire system is substantially the same. That is, the present invention is not limited to the above-described embodiments. It should be understood by those skilled in the art that various modifications, combinations, sub-combinations and alterations may occur depending on design requirements and other factors insofar as they are within the scope of the appended claims or the equivalents thereof.

What is claimed is:

1. An image processing device to correct chromatic aberration of image data, the image processing device comprising:
   overexposed pixel detecting means for detecting overexposed pixels by using a luminance signal of the image data;
   overexposure distribution information generating means for generating overexposure distribution information indicating distribution of the overexposed pixels detected by the overexposed pixel detecting means; and
   chromatic aberration amount calculating means for calculating an amount of chromatic aberration of each pixel by using the overexposure distribution information generated by the overexposure distribution information generating means and chromatic aberration amount distribution information indicating the distribution of the amount of chromatic aberration, which is an amount of correction regarding chromatic aberration of nearby pixels due to overexposure of a target pixel, the chromatic aberration amount calculating means calculating the amount of chromatic aberration of each pixel by adding a contribution value of chromatic aberration from each of a plurality of overexposed pixels within a correction range of the target pixel.

2. The image processing device according to claim 1, wherein the overexposed pixel detecting means includes:
   overexposed pixel threshold determining means for determining the overexposed pixel with respect to the target pixel by using a predetermined threshold; and
   overexposed pixels determining means for determining whether an overexposed pixel exists near the target pixel that has been determined to be an overexposed pixel by the overexposed pixel threshold determining means, and
   wherein the overexposed pixel detecting means detects the target pixel as an overexposed pixel only when the overexposed pixels determining means has determined that an overexposed pixel exists near the target pixel as an overexposed pixel.

3. The image processing device according to claim 1, wherein the overexposure distribution information is information indicating distribution of the overexposed pixels in a predetermined range around the target pixel, and wherein the overexposure distribution information generating means generates the overexposure distribution information for each pixel in the image data.

4. The image processing device according to claim 1, wherein the chromatic aberration amount calculating means includes magnification chromatic aberration correcting means for correcting distribution of the chromatic aberration amount distribution information so as to correct magnification chromatic aberration in accordance with the position in a screen of a target pixel of which chromatic aberration is to be corrected.

5. The image processing device according to claim 1, further comprising:
   chromatic aberration correcting means for correcting chromatic aberration of each pixel of the image data by using the amount of chromatic aberration calculated by the chromatic aberration amount calculating means.

6. The image processing device according to claim 5, further comprising:
   chromaticity calculating means for calculating chromaticity, indicating a level of color, of each pixel on the basis of a chrominance signal of the image data,
   wherein the chromatic aberration correcting means multiplies the amount of chromatic aberration calculated by the chromatic aberration amount calculating means by the chromaticity calculated by the chromaticity calculating means and corrects chromatic aberration of the image data by using the multiplication result.

7. The image processing device according to claim 6, further comprising:
   mixing means for mixing the image data corrected by the chromatic aberration correcting means and the image data before correction at a ratio based on the multiplication result generated by the chromatic aberration correcting means.

8. An image processing method implemented by a computer programmed as an image processing device to correct chromatic aberration of image data, the image processing method comprising:
   detecting, by the computer, overexposed pixels by using a luminance signal of the image data;
   generating overexposure distribution information indicating distribution of the detected overexposed pixels; and
   calculating an amount of chromatic aberration of each pixel by using the generated overexposure distribution information and chromatic aberration amount distribution information indicating distribution of the amount of chromatic aberration, which is an amount of correction regarding chromatic aberration of nearby pixels due to overexposure of a target pixel, the calculating including calculating the amount of chromatic aberration of each pixel by adding a contribution value of chromatic aberration from each of a plurality of overexposed pixels within a correction range of the target pixel.

9. A non-transitory computer-readable medium encoded with computer instructions, which when executed by a computer, cause the computer to execute a process of correcting chromatic aberration of image data, the process comprising:
   detecting overexposed pixels by using a luminance signal of the image data;
   generating overexposure distribution information indicating distribution of the detected overexposed pixels; and
   calculating an amount of chromatic aberration of each pixel by using the generated overexposure distribution information and chromatic aberration amount distribution information indicating distribution of an amount of chromatic aberration, which is the amount of correction regarding chromatic aberration of nearby pixels due to overexposure of a target pixel, the calculating including calculating the amount of chromatic aberration of each pixel by adding a contribution value of chromatic aberration from each of a plurality of overexposed pixels within a correction range of the target pixel.

10. An image processing device to correct chromatic aberration of image data, the image processing device comprising:

an overexposed pixel detecting unit configured to detect overexposed pixels by using a luminance signal of the image data;

an overexposure distribution information generating unit configured to generate overexposure distribution information indicating distribution of the overexposed pixels detected by the overexposed pixel detecting unit; and a chromatic aberration amount calculating unit, including a processor, configured to calculate an amount of chromatic aberration of each pixel by using the overexposure distribution information generated by the overexposure distribution information generating unit and chromatic aberration amount distribution information indicating distribution of the amount of chromatic aberration, which is an amount of correction regarding chromatic aberration of nearby pixels due to overexposure of a target pixel, the chromatic aberration amount calculating unit configured to calculate the amount of chromatic aberration of each pixel by adding a contribution value of chromatic aberration from each of a plurality of overexposed pixels within a correction range of the target pixel.

11. The image processing device according to claim 1, wherein the chromatic aberration amount calculating means includes comparing means for comparing the chromatic aberration amount distribution information with the overexposure distribution information for each pixel of the image data upon matching coordinates of a target pixel in the overexposure distribution information with coordinates of the target pixel in the chromatic aberration amount distribution information, and the chromatic aberration amount calculating means calculates the amount of chromatic aberration of each pixel based on a comparison result generated by the comparing means.

12. The image processing device according to claim 11, wherein the comparing means calculates the amount of chromatic aberration of each pixel of the image data by obtaining the amount of chromatic aberration of another target pixel due to each overexposed pixel included in the overexposure distribution information by using the chromatic aberration amount distribution information for the respective pixels and by integrating the amounts.

* * * * *